(12) United States Patent
Hasegawa

(10) Patent No.: US 11,405,148 B2
(45) Date of Patent: Aug. 2, 2022

(54) COMMUNICATION SYSTEM, COMMUNICATION DEVICE, METHOD, AND RECORDING MEDIUM OF PROGRAM

(71) Applicant: NEC Corporation, Tokyo (JP)

(72) Inventor: Yohei Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 385 days.

(21) Appl. No.: 16/488,869

(22) PCT Filed: Feb. 20, 2018

(86) PCT No.: PCT/JP2018/005881
§ 371 (c)(1),
(2) Date: Aug. 26, 2019

(87) PCT Pub. No.: WO2018/155406
PCT Pub. Date: Aug. 30, 2018

(65) Prior Publication Data
US 2020/0028631 A1    Jan. 23, 2020

(30) Foreign Application Priority Data

Feb. 27, 2017 (JP) .............................. JP2017-034413

(51) Int. Cl.
*H04L 1/18* (2006.01)
*H04L 1/16* (2006.01)
*H04L 5/00* (2006.01)

(52) U.S. Cl.
CPC .......... *H04L 1/1858* (2013.01); *H04L 1/1685* (2013.01); *H04L 5/0055* (2013.01); *H04L 5/0082* (2013.01)

(58) Field of Classification Search
CPC ... H04L 1/1858; H04L 1/1685; H04L 5/0055; H04L 5/0082
(Continued)

(56) References Cited

U.S. PATENT DOCUMENTS

2005/0169199 A1* 8/2005 Futenma ................ H04L 47/34
370/282
2007/0133414 A1* 6/2007 Krishna ................. H04L 69/16
370/235
(Continued)

FOREIGN PATENT DOCUMENTS

JP    2005-20590 A    1/2005
JP    2005-198055 A   7/2005
(Continued)

OTHER PUBLICATIONS

International Search Report in International Application No. PCT/JP2018/005881, dated May 15, 2018.
(Continued)

*Primary Examiner* — Chi Tang P Cheng
(74) *Attorney, Agent, or Firm* — Sughrue Mion, PLLC

(57) ABSTRACT

A receive terminal setting a non-delivery determination time for determining that a next data packet is not delivered after transmitting an acknowledgement (ACK) packet for a received data packet; when the next data packet is not delivered within the non-delivery determination time, the receive terminal repeatedly transmits a retransmission request (RACK) packet prompting the transmission of the next data packet; a transmit terminal specifies a non-delivered data packet using time difference information based on the time-of-day information of the received ACK packet and RACK packet and retransmits the specified data packet to the receive terminal; the time-of-day information here is a time stamp added by the receive terminal to each of the ACK packet and RACK packet when transmitted, or a time stamp added by the transmit terminal to each of the ACK packet and RACK packet when received.

20 Claims, 13 Drawing Sheets

COMMUNICATION SYSTEM 10

(58) Field of Classification Search
USPC .......................................................... 370/329
See application file for complete search history.

(56) References Cited

U.S. PATENT DOCUMENTS

| | | | | |
|---|---|---|---|---|
| 2011/0078529 | A1* | 3/2011 | Wu | ..................... H04L 1/1887 |
| | | | | 714/748 |
| 2013/0132788 | A1* | 5/2013 | Braun | .................. H04L 1/1819 |
| | | | | 714/750 |
| 2014/0355472 | A1 | 12/2014 | Hasegawa et al. | |

FOREIGN PATENT DOCUMENTS

| | | | |
|---|---|---|---|
| JP | 2007-274206 | A | 10/2007 |
| JP | 2008-283523 | A | 11/2008 |
| JP | 5185955 | B2 | 4/2013 |
| WO | 2013/125175 | A1 | 8/2013 |

OTHER PUBLICATIONS

Written Opinion in International Application No. PCT/JP2018/005881, dated May 15, 2018.
Yohei Hasegawa, et al., "A Performance Evaluation of TCP-FSO over Free-Space Optical Link", The Institute of Electronics, Information and Communication Engineers, IEICE Technical Report, May 2012, vol. 112, No. 27, p. 17-22 (6 pages total).
Japanese Office Communication for JP Application No. 2019-501323 dated Mar. 29, 2022 with English Translation.

* cited by examiner

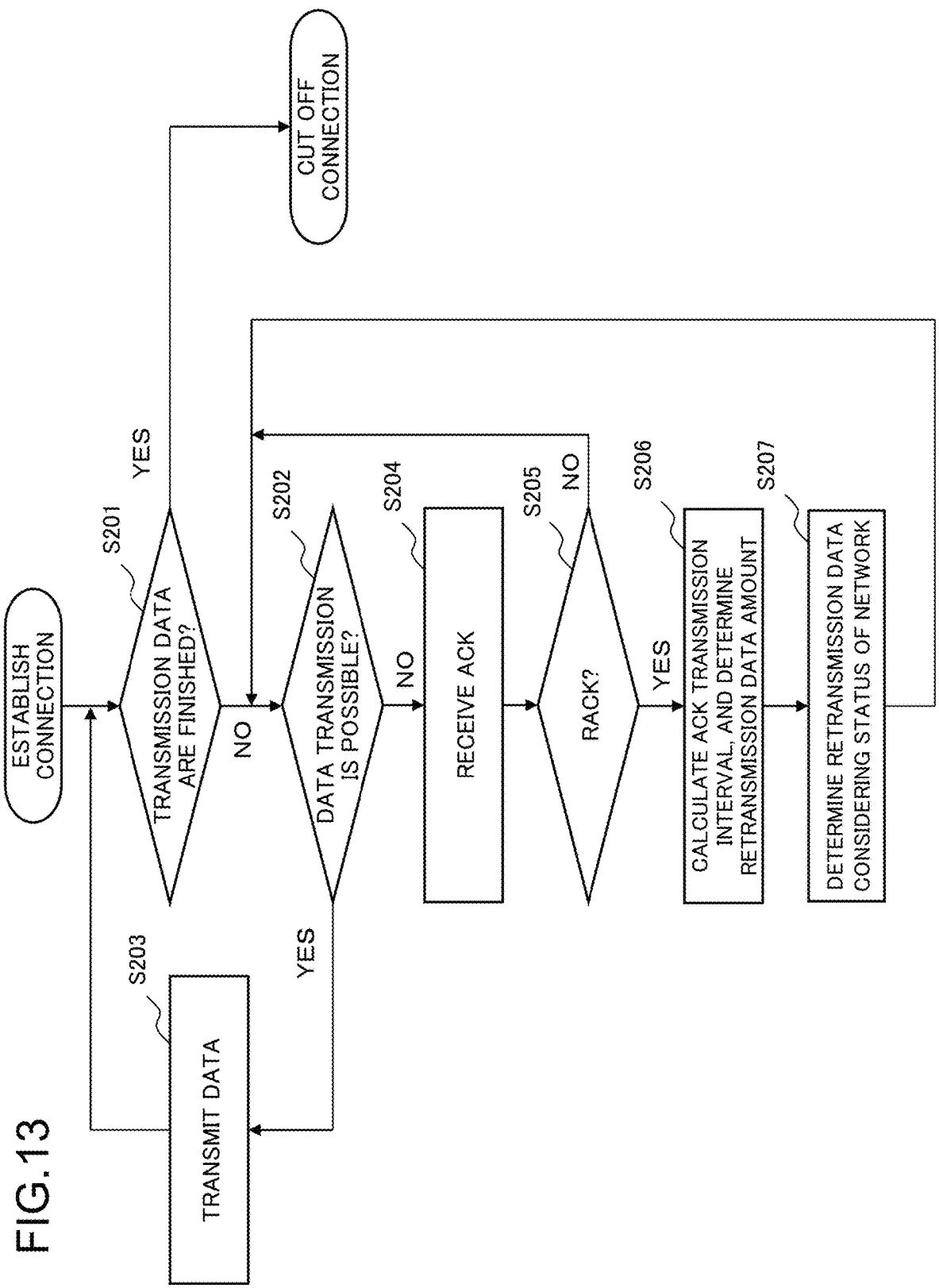

COMMUNICATION SYSTEM, COMMUNICATION DEVICE, METHOD, AND RECORDING MEDIUM OF PROGRAM

CROSS REFERENCE TO RELATED APPLICATIONS

This application is a National Stage of International Application No. PCT/JP2018/005881 filed Feb. 20, 2018, claiming priority based on Japanese Patent Application No. 2017-034413 filed Feb. 27, 2017.

TECHNICAL FIELD

The present invention relates to a communication system, a communication device, a method, and a program, and particularly relates to a communication system, a communication device, a method, and a program that use retransmission control by transmission control protocol (TCP).

BACKGROUND ART

Transmission control protocol/Internet protocol (TCP/IP) is widely used as a communication protocol that can ensure reliability of communication on a communication network such as the Internet. Further, TCP has a function of congestion control for acknowledgement, retransmission control, and congestion avoidance, in order to perform highly reliable communication.

An acknowledgement, retransmission control, and congestion control provided in TCP are viewed broadly below.

An acknowledgement returns, to a transmission terminal, an acknowledgement (ACK) packet indicating that a reception terminal has confirmed reception of a data packet transmitted by the transmission terminal. This acknowledgement packet is hereinafter also referred to as an ACK packet.

A sequence number is given to a data packet transmitted by a transmission terminal, and a reception terminal updates an ACK number of an ACK packet to be returned to the data packet, by the sequence number given to the data packet, and a data size in which the data packet is received. Moreover, the transmission terminal determines an ACK number indicated by a received ACK packet as a sequence number of a data packet to be transmitted next. Thereby, the reception terminal notifies the transmission terminal of a sequence number of a data packet expected to be received next, as an ACK number. Then, by receiving the ACK packet, the transmission terminal understands to which sequence number the reception terminal has received data packet.

Furthermore, an ACK packet is set to a window size for performing flow control, depending on a reception buffer capacity of a reception terminal, and indicated as an advertised window. In other words, the window size is set to be small when the reception buffer capacity is decreased by data reception, whereas the window size is set to be large when data are read by a host application and thus the reception buffer capacity is increased.

Retransmission control is control in which, when disappearance of a transmitted data packet on a communication network is detected, a transmission terminal retransmits the transmitted data packet.

A transmission terminal performs two kinds of retransmission control including time out retransmission and high-speed retransfer depending on reception status of an ACK packet.

Time out retransmission is as follows: when a transmission terminal fails to receive an ACK packet for reception confirmation of a transmitted data packet even after waiting for a predetermined time, the transmission terminal retransmits the data packet reception of which is not confirmed.

For example, when a transmitted data packet disappears in a communication network, a reception terminal is not able to transmit an ACK packet an ACK number of which is updated. Thus, when a transmission terminal fails to receive an associated ACK packet even after waiting for a predetermined time, the transmission terminal determines that the data have not reached the reception terminal, and retransmits a data packet of a sequence number indicated by an ACK number received last.

When transmitting a data packet for preparation of time out retransmission, the transmission terminal sets, to an initial time, a retransmission timer (retransmission time out, RTO) for waiting to receive a return of an ACK packet associated with the data packet, and then starts the timer.

There is a concern that a set time of a retransmission timer, when set to be short, causes erroneous retransmission to be performed and communication efficiency to be aggravated even though a packet does not disappear on a communication network in a case where a delay occurs in data transfer. Thus, a set time of a retransmission timer is set by taking a sufficient margin for a packet round trip time (RTT) in a communication network. Under regulation by request for comments (RFC), a value acquired by multiplying a variation history of RTT by 4 is determined as an initial time.

When a retransmission timer times out without an ACK packet for an acknowledgement returning from a reception terminal, only one data packet for which an acknowledgement has failed to be acquired is retransmitted to the reception terminal. Then, each time the retransmission timer operates, a set time of a next retransmission timer is regulated in such a way as to be elongated by two times.

High-speed retransfer is retransmission control of performing retransmission in response to a retransmission acknowledgement from a reception terminal.

A transmission terminal can successively transmit a number of data packets permitted by a window size notified of from a reception terminal, without waiting for an ACK packet. In this case, the reception terminal also returns one ACK packet indicating sequence numbers normally received in succession, for collectively received data packets. The transmission terminal determines whether a data packet is normally received by viewing the ACK packet arriving late in this way.

When discerning, based on a sequence number of a received data packet, that there is a data packet which is not received due to absence of a sequence number, a reception terminal notifies a transmission terminal of the absent sequence number, and then requests retransmission of an associated data packet.

The absent sequence number is notified of by transmitting a duplicate ACK packet having a same ACK number as an ACK packet returned for a data packet normally received most recently. In other words, an ACK number of a duplicate ACK packet is a sequence number of a data packet expected to be received next to a data packet reception of which has been confirmed most recently, and this sequence number is an absent sequence number.

Further, the reception terminal transmits a duplicate ACK packet until receiving a data packet of a sequence number for which retransmission is requested. In other words, even when a data packet of another sequence number is normally received subsequently, a duplicate ACK packet notifying of an absent sequence number is transmitted.

A transmission side knows at a point of receiving duplicate ACK packets three times that there is an unarrived data packet. Retransmission is not performed at the first and second duplicate ACK packets, taking into consideration a possibility that arrival orders of data packets are only replaced on a reception side.

When receiving a data packet of a sequence number for which retransmission is requested, a reception device notifies, by an ACK packet, a transmission device of a latest sequence number of a data packet which can be normally received so far, and then, transmission and reception of subsequent data packets are continued.

Furthermore, when a middle data packet is missing, there is an option for retransmission control in which a reception terminal notifies a transmission terminal of a missing data packet by a selective ACK (SACK). The transmission terminal views contents of the SACK, and then retransmits only a data packet of a missing part.

TCP carries out congestion control for congestion avoidance while performing the above-described acknowledgement and retransmission control. Congestion control is performed in a transmission terminal by use of a congestion window (cwnd) being a value for increasing and decreasing a data amount transmittable depending on communication status. The cwnd indicates a number of packets (window size) permitted to be successively transmitted at a time, and is initially set to be small, and set to be greater little by little each time an ACK packet is received from a reception terminal.

TCP is intended for congestion avoidance by setting a cwnd to be small because there is a possibility that an error or congestion further occurs when transmission is kept on in a case where a packet loss occurs. There are two kinds of cwnds: one set during time out retransmission and one set during high-speed retransfer.

It is normally conceivable that time out retransmission occurs when a communication network is extremely congested and when a serious fault is occurring. Thus, when time out retransmission occurs, a number of packets to be transmitted is greatly narrowed down by resetting the cwnd to an initial state. The initial state is normally 1.

It is considered that retransmission resulting from high-speed retransfer occurs because a communication network is lightly congested, there is only missing in data packets arrived at a reception terminal, and no such a great failure that a plurality of data packets disappear is occurring. Thus, when there is retransmission resulting from high-speed retransfer, a number of packets to be transmitted is narrowed down to half by setting the cwnd to ½.

Note that, a window includes an advertised window (awnd) indicating a free space of a buffer provided in a reception terminal, and informing a transmission terminal by writing into an ACK packet. Moreover, an awnd notified of by a most recent ACK packet is referred to as a receive window (rwnd). The transmission terminal performs congestion control of data transfer by use of a smaller one of values of the cwnd and the rwnd.

In connection with the function of TCP viewed broadly above, PTLs 1 to 5 each disclose a technique for detecting disappearance of a packet when data are transmitted and received on a communication network, and requesting a transmission-side communication device for retransmission of disappeared packet data.

PTL 1 relates to a communication device handling real-time transport protocol (RTP) and real-time transport control protocol (RTCP) for delivering, in real time, a data stream in which audio data and video data are encoded. PTL 1 solves a problem of lacking in real-time performance, the problem being caused since absent packet data can only be detected at a timing when packet data having a sequence number following an absent sequence number are received in high-speed retransfer.

PTL 1 discloses a technique of requesting retransmission of packet data by measuring a predetermined time interval on a reception side. According to the technique, retransmission of packet data is requested by transmitting a retransmission acknowledgement negative ACK (NACK) to a transmission source when packet data to be received following packet data received last time are not received within a predetermined time after packet data are received last time. Moreover, it is assumed that a retransmission acknowledgement sequence number in which "1" is added to a sequence number of lately received packet data is used as a retransmission request NACK.

PTL 2 solves a problem that duplicate retransmission is performed by time out retransmission when a data packet is retransmitted in response to a retransmission request from a reception side in high-speed retransfer, and then, time out arrives before an acknowledgement for the retransmitted data packet is received.

In order to prevent such duplicate retransmission, PTL 2 performs, on a transmission side, control of increasing a time-out time regarding an already transmitted data packet for which a reception acknowledgement is not made, in connection with retransmission actually performed for a retransmission request.

PTL 3 discloses a technique of improving a TCP data transmission process by reducing a restart time of TCP connection after a physical transfer medium is cut off and becomes again available. The technique disclosed by PTL 3 is configured in such a way that, when a client (reception side) detects that data flow from a server (transmission side) is cut off, the client prompts retransmission of a data packet by repeatedly transmitting a same ACK message to the server. According to the technique, the client starts a timer having a preset time T1 after transmitting an ACK for a data packet received from the server. The timer stops when receiving the data packet from the server. The client detects by time out of the time T1 that a next data packet from the server has not arrived, and, in this case, the client retransmits the same ACK message. By such configuration, it is possible to shorten a time in which data transfer remains interrupted after cutting off the physical transfer medium becomes again available.

PTL 4 discloses a technique relating to a countermeasure when data transmitted by a transmission terminal arrive at a reception terminal, and an ACK packet for an acknowledgement of the data disappears in a network and thus does not reach the transmission terminal. When such a situation arises, even normally unnecessary data are retransmitted by time out retransmission in the transmission terminal, which decreases throughput of the network. Moreover, by receiving no ACK packet, the transmission terminal reduces a congestion window, and unnecessarily decreases an amount of data to be transmitted.

The technique disclosed by PTL 4 determines whether or not retransmission of an ACK packet is required, based on whether or not new data are received from a transmission terminal within a predetermined time after a reception terminal transmits an ACK packet. The reception terminal performs retransmission of an ACK packet when receiving no new data from the transmission terminal within the predetermined time. Thus, even when an ACK packet transmitted by the reception terminal disappears in a network, the transmission terminal can receive a retransmitted ACK packet before a time-out time in the transmission terminal.

With the technique disclosed by PTL 4, it is possible to retransmit an ACK before retransmission time out in the transmission terminal by setting the above-described predetermined time to be shorter than a time-out time of a retransmission timer of the transmission terminal. Thereby, it is possible to avoid retransmission of unnecessary data, and maintain a transmission data amount.

Note that, to an ACK packet to be retransmitted, predetermined information indicating that the ACK packet is a retransmission ACK packet is added in such a way that the ACK packet can be distinguished from three duplicate ACK packets used in high-speed retransfer.

Furthermore, PTL 5 discloses a technique of transmitting, to a transmission device, a packet requesting retransmission of an unarrived packet when loss of a packet is detected.

CITATION LIST

Patent Literature

[PTL 1] Japanese Unexamined Patent Application Publication No. 2005-020590
[PTL 2] Japanese Unexamined Patent Application Publication No. 2008-283523
[PTL 3] Japanese Patent No. 5185955
[PTL 4] International Publication WO 2013/125175
[PTL 5] Japanese Unexamined Patent Application Publication No. 2005-198055

SUMMARY OF INVENTION

Technical Problem

In the Internet or a wireless communication system, availability in each communication direction is often asymmetric, and there are cases where transmission data disappear, but an acknowledgement (ACK) in an opposite direction can arrive. In other words, an environment is assumed where line quality from a transmission terminal to a reception terminal becomes poor, and a large number of transmitted data packets disappear in succession, but line quality from the reception terminal to the transmission terminal is kept normal.

PTL 1 discloses a technique for detecting that there is an unreceived data packet on a reception terminal side, and then requesting a transmission terminal for retransmission of the data packet.

Suppose a case where, among data packets transmitted from a transmission terminal to a reception terminal, an initial data packet reaches the reception terminal, but a large number of subsequent data packets disappear in succession. The reception terminal returns an ACK packet for the initially received data packet to the transmission terminal. However, data packets after the initially received data packet are not received. Thus, the reception terminal returns, to the transmission terminal, a retransmission request NACK requesting retransmission after elapse of a permissive packet time interval from reception of the initial data packet. The transmission terminal can receive the retransmission request NACK, and therefore, retransmits a requested data packet, but the retransmitted data packet also disappears. Even with such a configuration that a same retransmission request NACK can be repeatedly transmitted at a predetermined time interval, a same requested data packet is only retransmitted each time a retransmission request NACK is received.

Assume a situation where the line quality from the transmission terminal to the reception terminal is improved later, and a data packet from the transmission terminal comes to arrive at the reception terminal. The transmission terminal only retransmits a data packet specified by a retransmission request NACK, and is not able to retransmit a next data packet until receiving a retransmission request from the reception terminal. With the technique disclosed by PTL 1, it is not possible to understand what amount of data has disappeared in such a case that a large number of data packets disappear in succession. Thus, even though a line is recovered, retransmission is performed after a retransmission request from the reception terminal is sequentially received, and therefore, it takes time until the reception terminal receives a data packet that has disappeared, and it is not possible to immediately improve communication performance.

PTL 2 discloses a technique of, on a transmission side, minimizing time out retransmission regarding an already transmitted data packet for which a reception acknowledgement is not made, in connection with retransmission by high-speed retransfer.

In such a case that an initial data packet transmitted from a transmission terminal to a reception terminal reaches the reception terminal, but a large number of subsequent data packets disappear in succession, the reception terminal is not able to transmit a duplicate ACK packet. Thus, with the technique disclosed by PTL 2, time out retransmission is repeatedly performed in the transmission terminal. Then, throughput of data transfer is greatly decreased even when a line is recovered.

PTL 3 discloses a technique in which, when a physical transfer medium is cut off, and a data packet from a transmission side does not arrive at a reception side prompts retransmission of a data packet by repeatedly transmitting a same ACK message by predetermined time out to the transmission side.

Since line quality from the reception terminal to the transmission terminal is kept normal, an ACK message transmitted by the reception terminal for each time out is repeatedly transmitted to the transmission side. Then, the transmission terminal repeatedly retransmits a data packet for which retransmission is prompted. When the line quality from the transmission terminal to the reception terminal is improved later, and a data packet from the transmission terminal comes to arrive at the reception terminal, there is a problem similar to that of the technique disclosed by PTL 1. In other words, under such a situation that a large number of data packets disappear in succession, the transmission terminal only retransmits a data packet for which retransmission is prompted, even when a line is recovered. Thus, it takes time until the reception terminal receives a data packet that has disappeared, and it is not possible to immediately improve communication performance.

PTL 4 discloses a technique that introduces a retransmission ACK packet prompting retransmission before time of a retransmission timer is up in a transmission terminal when a reception terminal does not receive new data from the transmission terminal within a predetermined time after transmitting an ACK packet.

This retransmission ACK packet is designed to be distinguished from three duplicate ACKs used in high-speed retransfer. Thus, when line quality from the reception terminal to the transmission terminal is kept normal, a retransmission ACK packet transmitted on the reception side reaches the transmission terminal, and the transmission side repeats retransmission pertaining to the retransmission ACK packet. When the line quality from the transmission terminal to the reception terminal is improved later, and a data packet from the transmission terminal comes to arrive at the reception terminal, there is a problem similar to those of the techniques disclosed by PTLs 1 and 3. In other words, under such a situation that a large number of data packets disappear in succession, a data packet for which retransmission is requested is retransmitted, but it is not possible to know how many data packets are absent. Thus, even when a line is recovered, data throughput of the transmission terminal is decreased, and it is not possible to immediately improve communication performance.

In view of the above, the present invention provides a communication system, a communication device, a retransmission control method, and a program that can, even if there arises a situation where a large number of transmitted data packets disappear in succession, instantly improve communication performance when such a situation is resolved.

Solution to Problem

To achieve the purpose described above, a communication system that is an aspect of the present invention includes: a reception terminal that sets an unarrival determination time for determining that a next data packet does not arrive after transmitting an acknowledgement (ACK) packet for a received data packet, and, when a next data packet does not arrive within the unarrival determination time, repeatedly transmits a retransmission acknowledgement (RACK) packet prompting transmission of the next data packet at intervals of the unarrival determination time; and a transmission terminal that specifies a data packet that has not reached the reception terminal, by use of time difference information based on time information of the most recently received ACK packet or the most recently received RACK packet and time information of the currently received RACK packet when receiving the RACK packet from the reception terminal on and after reception of the ACK packet, and then retransmits the specified data packet, wherein the time information is a time stamp added by the reception terminal to each of the ACK packet and the RACK packet when transmitted, or a time stamp added by the transmission terminal to each of the ACK packet and the RACK packet when received.

A communication device, which is another aspect of the present invention, is characterized by including retransmission control means for, when receiving a retransmission request (RACK) packet prompting transmission of a next data packet that is repeatedly transmitted by a reception side at an unarrival determination time interval for determining that a next data packet does not arrive on and after reception of an acknowledgement (ACK) packet returned by the reception side for a transmitted data packet, specifying a data packet that has not reached the reception side, by use of time difference information based on time information of the most recently received ACK packet or the most recently received RACK packet and time information of the currently received RACK packet, and then retransmitting the specified data packet, wherein the time information is a time stamp added by the reception side to each of the ACK packet and the RACK packet when transmitted, or a time stamp added by the retransmission control means to each of the ACK packet and the RACK packet when received.

Further, a retransmission control method, which is another aspect of the present invention, is characterized by including: receiving a retransmission request (RACK) packet prompting transmission of a next data packet that is repeatedly transmitted by a reception side at an unarrival determination time interval for determining that a next data packet does not arrive on and after reception of an acknowledgement (ACK) packet returned by the reception side for a transmitted data packet; and specifying a data packet that has not reached the reception side, by use of time difference information based on time information of the most recently received ACK packet or the most recently received RACK packet and time information of the currently received RACK packet, and then retransmitting the specified data packet, wherein the time information is a time stamp added to each of the ACK packet and the RACK packet when transmitted, or a time stamp added to each of the ACK packet and the RACK packet when received.

In addition, a retransmission control program, which is another aspect of the present invention, causes a computer to function as retransmission control function means for, when receiving a retransmission request (RACK) packet prompting transmission of a next data packet that is repeatedly transmitted by a reception side at an unarrival determination time interval for determining that a next data packet does not arrive on and after reception of an acknowledgement (ACK) packet returned by the reception side for a transmitted data packet, specifying a data packet that has not reached the reception side, by use of time difference information based on time information of the most recently received ACK packet or the most recently received RACK packet and time information of the currently received RACK packet, and then retransmitting the specified data packet, wherein the time information is a time stamp added by the reception side to each of the ACK packet and the RACK packet when transmitted, or a time stamp added by the retransmission control function means to each of the ACK packet and the RACK packet when received.

Advantageous Effects of Invention

Even if there arises a situation where a large number of transmitted data packets disappear in succession, the present invention can instantly improve communication performance when such a situation is resolved.

BRIEF DESCRIPTION OF DRAWINGS

FIG. 13 is a flowchart describing an operation of retransmission control on a transmission side according to the second example embodiment of the present invention.

EXAMPLE EMBODIMENT

An overview of an example embodiment of the present invention is described.

Note that, an example embodiment is an exemplar, and a system, a device, and a method that are disclosed are not limited to a configuration of each of the following example embodiments. Moreover, a reference sign given to a drawing is additionally noted as one example for convenience to help understanding, and is not intended for any limitation. Further, a direction of an arrow in a drawing indicates one example, and does not limit a direction of a signal between blocks.

First Example Embodiment

A first example embodiment is described with reference to FIGS. 1 to 5.

Figure 1:
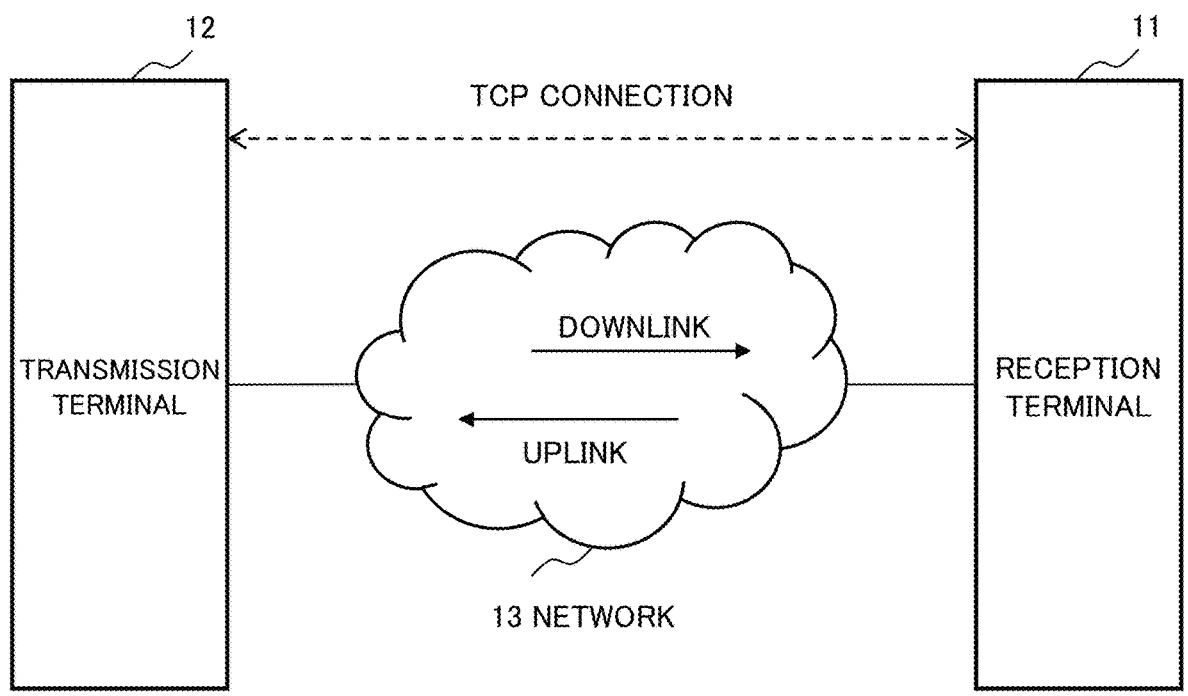
FIG. 1 is a block diagram illustrating a configuration example of a communication system according to a first example embodiment of the present invention.

FIG. 1 is a block diagram illustrating a configuration example of a communication system according to the first example embodiment of the present invention.

A communication system 10 according to the first example embodiment has a configuration including a reception terminal 11 and a transmission terminal 12.

The reception terminal 11 and the transmission terminal 12 are connected by establishing TCP connection on a network 13 being a communication network that is capable of data transmission compliant with a communication standard of TCP. The Internet is cited as a representative network of the network 13, but the network 13 may be any network having a communication line being capable of transmission and reception of a packet by TCP. The network 13 may be, for example, an Internet protocol (IP) telephone network, a local area network (LAN), a wide area network (WAN), a satellite communication network, a dedicated line network, or the like.

On the network 13, there are set an uplink directed from the reception terminal 11 toward the transmission terminal 12, and a downlink directed from the transmission terminal 12 toward the reception terminal 11. A data packet transmitted by the transmission terminal 12 passes through the downlink, and an acknowledgement (an ACK packet) transmitted by the reception terminal 11 is transferred through the uplink.

In the present example embodiment, a case is assumed in which there may arise a situation where, in the downlink from the transmission terminal 12 toward the reception terminal 11, a large number of data packets being transferred disappear in succession due to aggravation or the like of line quality of a transmission medium, for example, resulting from an external factor.

The reception terminal 11 transmits an ACK packet for a data packet received from the transmission terminal 12. Then, when transmitting the ACK packet, the reception terminal 11 sets an unarrival determination time for determining that a data packet that the reception terminal 11 waits to receive next does not arrive. When a next data packet does not arrive within the set unarrival determination time, the reception terminal 11 transmits a retransmission request (RACK) packet prompting transmission of the next data packet. After the transmission of a RACK packet as well, the reception terminal 11 sets an unarrival determination time for determining that a data packet which the reception terminal 11 waits to receive next does not arrive, and repeatedly transmits a RACK packet at each of the unarrival determination times until a next data packet arrives.

The transmission terminal 12 performs retransmission when receiving a RACK packet on and after reception of an ACK packet. The transmission terminal 12 specifies a data packet which has not reached the reception terminal 11, by use of time difference information based on time information of the most recently received ACK packet or a RACK packet, and time information of the currently received RACK packet, and then retransmits the specified data packet. Herein, the time information is a time stamp added by the reception terminal to each of the ACK packet and the RACK packet when transmitted, or a time stamp added by the transmission terminal to each of the ACK packet and the RACK packet when received.

A RACK packet is repeatedly transmitted from the reception terminal 11 until a next data packet that the reception terminal 11 waits to receive arrives. Thus, when receiving a RACK packet after receiving an ACK packet, the transmission terminal 12 specifies a data packet that has not reached the reception terminal 11, by use of time difference information between the ACK packet and the received RACK packet. Moreover, when the transmission terminal 12 comes to repeatedly receive a RACK packet, the transmission terminal 12 specifies a data packet that has not reached the reception terminal 11, by use of time difference information between a currently received RACK packet and the most recently received RACK packet.

Figure 2:
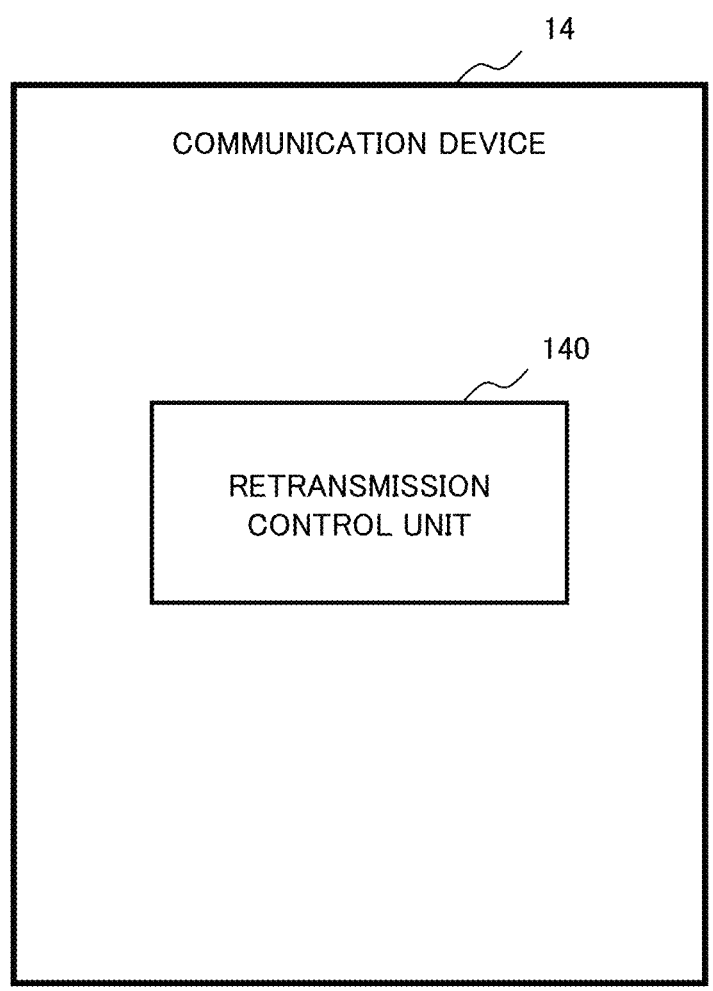
FIG. 2 is a block diagram illustrating a configuration example of a communication device according to the first example embodiment of the present invention.

FIG. 2 is a block diagram illustrating a configuration example of a communication device according to the first example embodiment of the present invention.

A communication device 14 is a communication device applied to the transmission terminal 12 in the above-described communication system 10.

The communication device 14 has a configuration including a retransmission control unit 140.

The retransmission control unit 140 receives a retransmission request (RACK) packet from a reception side on and after reception of an acknowledgement (ACK) packet returned for a transmitted data packet by the reception side.

The RACK packet is a packet repeatedly transmitted by the reception side at an unarrival determination time interval by which the reception side determines that a next data packet does not arrive, and is a packet prompting transmission of a next data packet that does not arrive at the reception side.

The retransmission control unit 140 specifies a data packet that has not reached the reception side, by use of time difference information based on time information of an ACK packet received just before reception of a RACK packet or a RACK packet, and time information of the currently received RACK packet, and then retransmits the specified data packet. Herein, the above-described time information is a time stamp added by the reception terminal to each of the ACK packet and the RACK packet when transmitted, or a time stamp added by the retransmission control unit 140 to each of the ACK packet and the RACK packet when received.

A RACK packet is repeatedly transmitted from the reception side until a next data packet that the reception side waits to receive arrives. Thus, when receiving a RACK packet after receiving an ACK packet, the retransmission control unit 140 specifies a data packet that has not reached the reception side, by use of time difference information between the ACK packet and the received RACK packet.

When the retransmission control unit 140 comes to repeatedly receive a RACK packet, the retransmission control unit 140 specifies a data packet that has not reached the reception terminal 11, by use of time difference information between a currently received RACK packet and the most recently received RACK packet.

Figure 3:
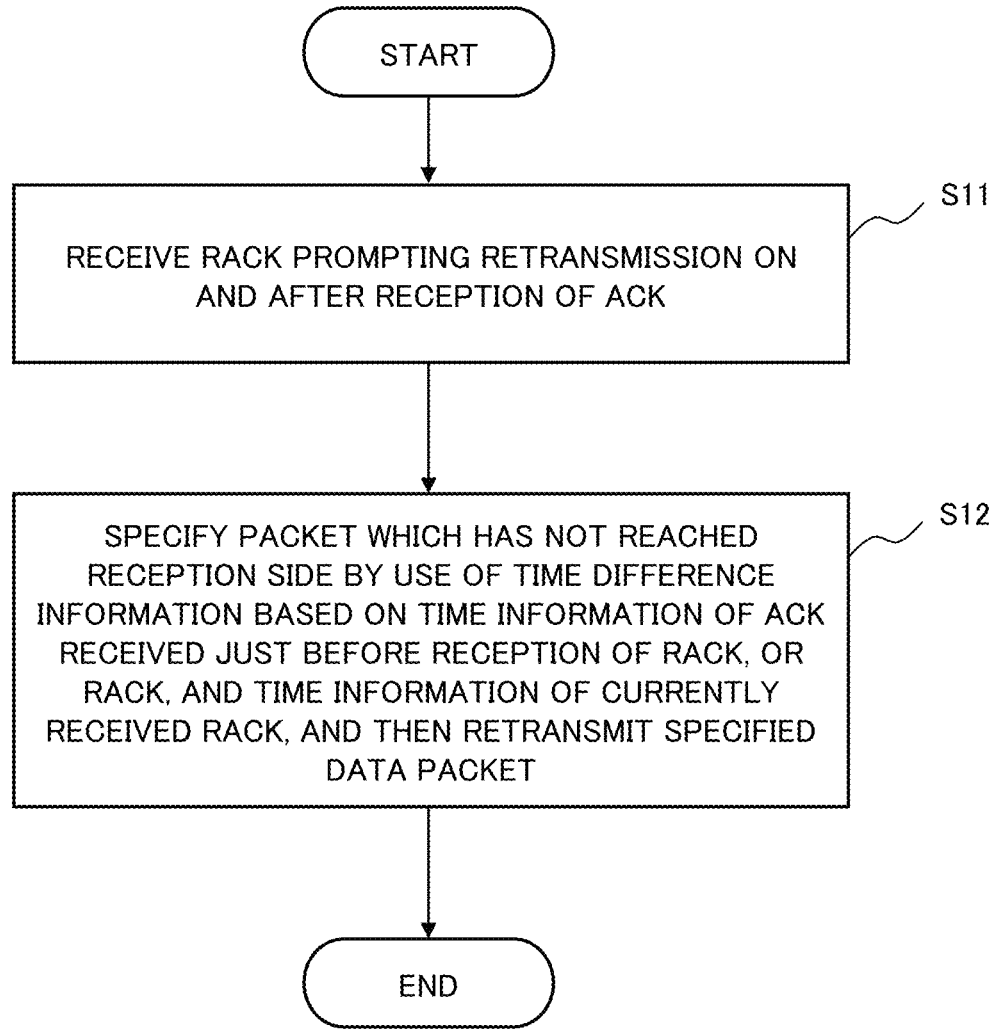
FIG. 3 is a flowchart illustrating an operation example of a retransmission control method according to the first example embodiment of the present invention.

FIG. 3 is a flowchart illustrating an operation example of a retransmission control method according to the first example embodiment of the present invention.

The retransmission control method according to the first example embodiment is implemented by the communication device 14 operating as in the flow illustrated in FIG. 3.

On and after reception of an acknowledgement (ACK) packet returned for a transmitted data packet by a reception side, a retransmission request (RACK) packet is received from the reception side (S11).

A RACK packet is a packet repeatedly transmitted by the reception side at an unarrival determination time interval by which the reception side determines that a next data packet does not arrive, and is a packet prompting transmission of a next data packet that does not arrive at the reception side.

A data packet which has not reached the reception side is specified by use of time difference information based on time information of an ACK packet received just before reception of a RACK packet or a RACK packet, and time information of the currently received RACK packet, and then, the specified data packet is retransmitted (S12). Herein, the above-described time information is a time stamp added to each of the ACK packet and the RACK packet when transmitted, or a time stamp added to each of the ACK packet and the RACK packet when received.

A RACK packet is repeatedly transmitted from the reception side until a next data packet that the reception side waits to receive arrives. Thus, when receiving a RACK packet after receiving an ACK packet, a data packet that has not reached the reception side is specified by use of time difference information between the ACK packet and the received RACK packet. Further, when a RACK packet comes to be repeatedly received, a data packet that has not reached the reception side is specified by use of time difference information between a currently received RACK packet and the most recently received RACK packet.

Figure 4:
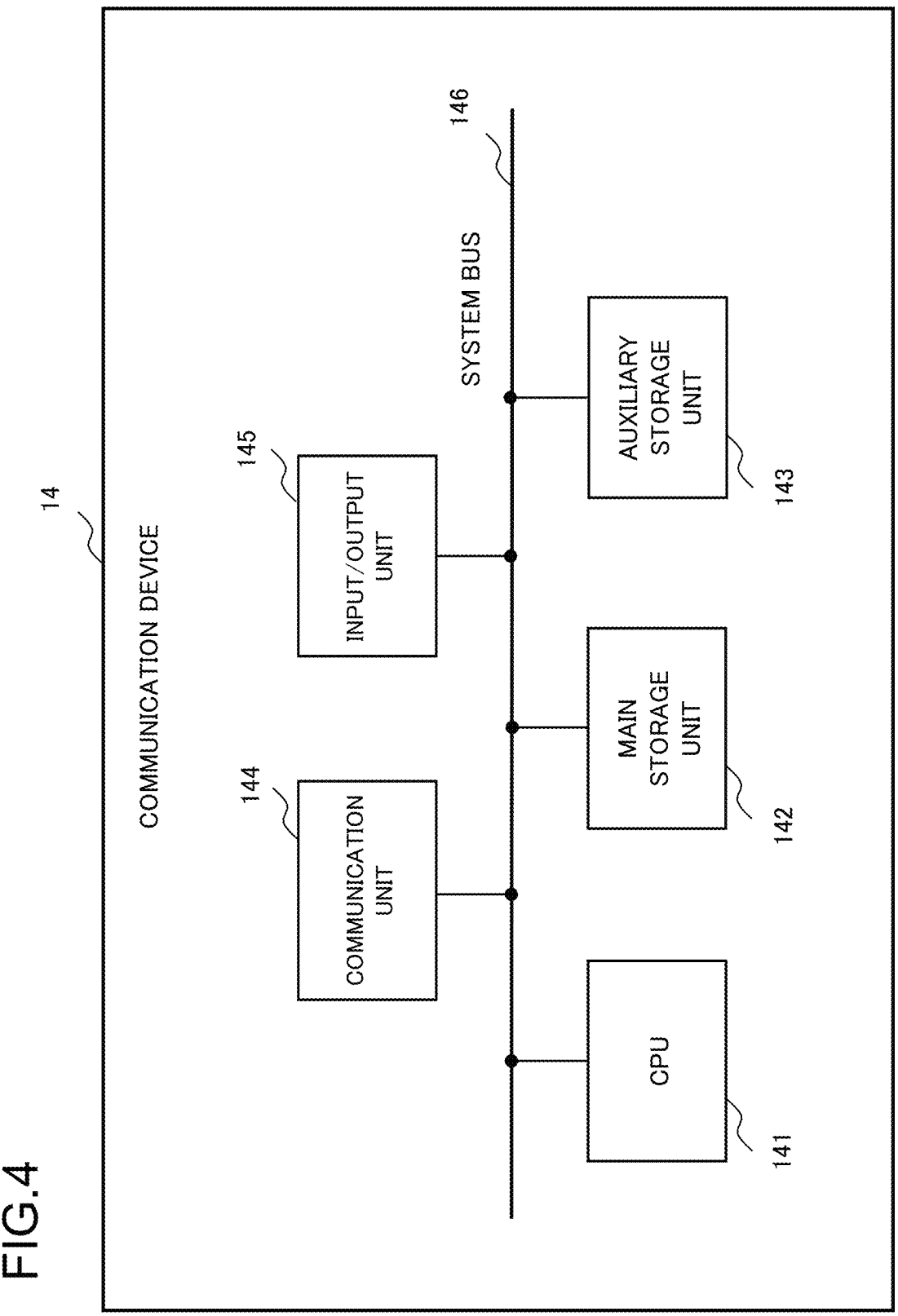
FIG. 4 is a block diagram illustrating a configuration example of hardware of the communication device according to the first example embodiment of the present invention.

FIG. 4 is a block diagram illustrating a configuration example of hardware of the communication device according to the first example embodiment of the present invention.

Referring to FIG. 4, the communication device 14 can be implemented by a hardware configuration similar to that of a general computer device, and has the following configuration.

As a hardware configuration, the communication device 14 includes a central processing unit (CPU) 141 being a control unit, a main storage unit 142, and an auxiliary storage unit 143. The main storage unit 142 is configured by a random access memory (RAM) or the like, and the auxiliary storage unit 143 includes a hard disk device configured from a non-volatile memory such as a magnetic disk or a semiconductor memory.

Furthermore, as a hardware configuration, the communication device 14 includes a communication unit 144 which performs communication with outside via a communication line, an input/output unit 145 as a man-machine interface, a system bus 146 which interconnects the above-described components, and the like.

The communication device 14 according to the present example embodiment can be implemented as software by executing, in the CPU 141 on a computer processing device, a program which provides each function related to retransmission control of a data packet in TCP connection.

In other words, the CPU 141 implements each function as software by loading, onto the main storage unit 142, and then executing a program saved in the auxiliary storage unit 143, or by directly executing the program on the auxiliary storage unit 143 and controlling an operation of the communication device 14.

As described above, the communication device 14 is a device that functions as the transmission terminal 12 in the communication system 10 described with FIG. 1.

Figure 5:
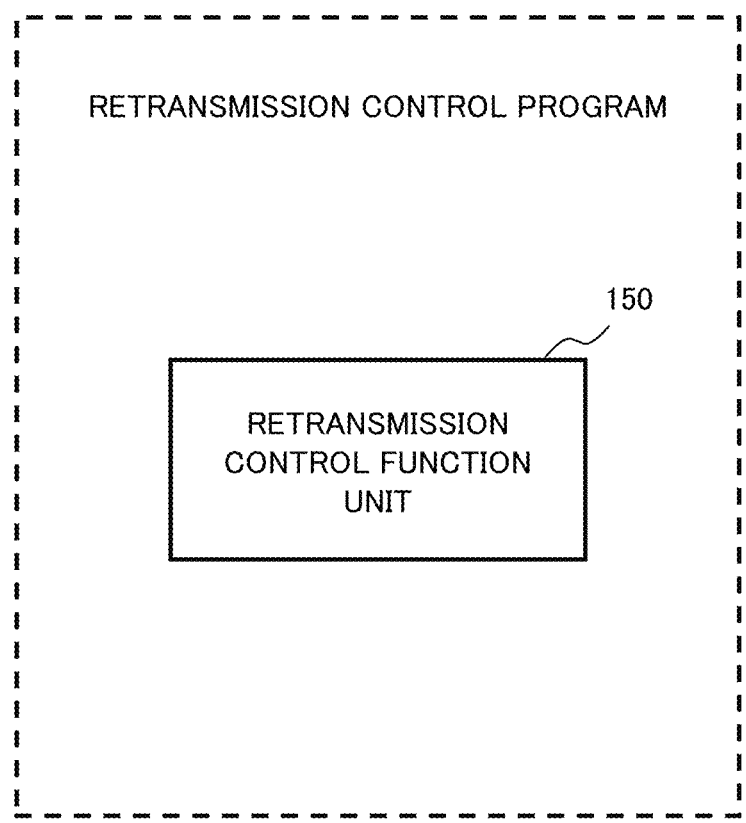
FIG. 5 is a block diagram illustrating a configuration example of a function means implemented by a retransmission control program according to the first example embodiment of the present invention.

A configuration of a function means implemented by a retransmission control program according to the first example embodiment of the present invention is illustrated in FIG. 5.

The retransmission control program according to the first example embodiment of the present invention causes a computer to function as a retransmission control function unit 150.

The retransmission control function unit 150 receives a retransmission request (RACK) packet from a reception side on and after reception of an acknowledgement (ACK) packet returned for a transmitted data packet by the reception side.

The RACK packet is a packet repeatedly transmitted by the reception side at an unarrival determination time interval by which the reception side determines that a next data packet does not arrive, and is a packet prompting transmission of a next data packet that does not arrive at the reception side.

The retransmission control function unit 150 specifies a data packet that has not reached the reception side, by use of time difference information based on time information of an ACK packet received just before reception of a RACK packet or a RACK packet, and time information of the currently received RACK packet, and then retransmits the specified data packet. Herein, the above-described time information is a time stamp added by the reception side to each of the ACK packet and the RACK packet when transmitted, or a time stamp added by the retransmission control function unit 150 to each of the ACK packet and the RACK packet when received.

A RACK packet is repeatedly transmitted from the reception side until a next data packet that the reception side waits to receive arrives. Thus, when receiving a RACK packet after receiving an ACK packet, the retransmission control function unit 150 specifies a data packet that has not reached the reception side, by use of time difference information between the ACK packet and the received RACK packet. Further, when the retransmission control function unit 150 comes to repeatedly receive a RACK packet, the retransmission control function unit 150 specifies a data packet that has not reached the reception side, by use of time difference information between a currently received RACK packet and most recently received RACK packet.

As above, in the present example embodiment, when receiving a RACK packet from a reception side on and after reception of a return of an ACK packet for a transmitted data packet, a transmission side recognizes that transmission of a next data packet which does not arrive at the reception side is prompted. A RACK packet is repeatedly transmitted from the reception side until a next data packet that the reception side waits to receive arrives. Then, by use of time difference information between time information of the most recently received ACK packet or a RACK packet, and time information of the currently received RACK packet, the transmission side specifies a data packet transmitted during the time. This time difference may be understood as a transmission time difference between an ACK packet and a RACK packet, or a reception time difference. By using this time difference, it is possible to specify not only a next data packet requested by a RACK packet, but also a plurality of data packets which have disappeared in succession, and then retransmit the data packets.

Therefore, according to the present example embodiment, even though there arises a situation where a large number of transmitted data packets disappear in succession, it is possible to instantly improve communication performance when such a situation is resolved.

Second Example Embodiment

Next, a second example embodiment is described.

Figure 6:
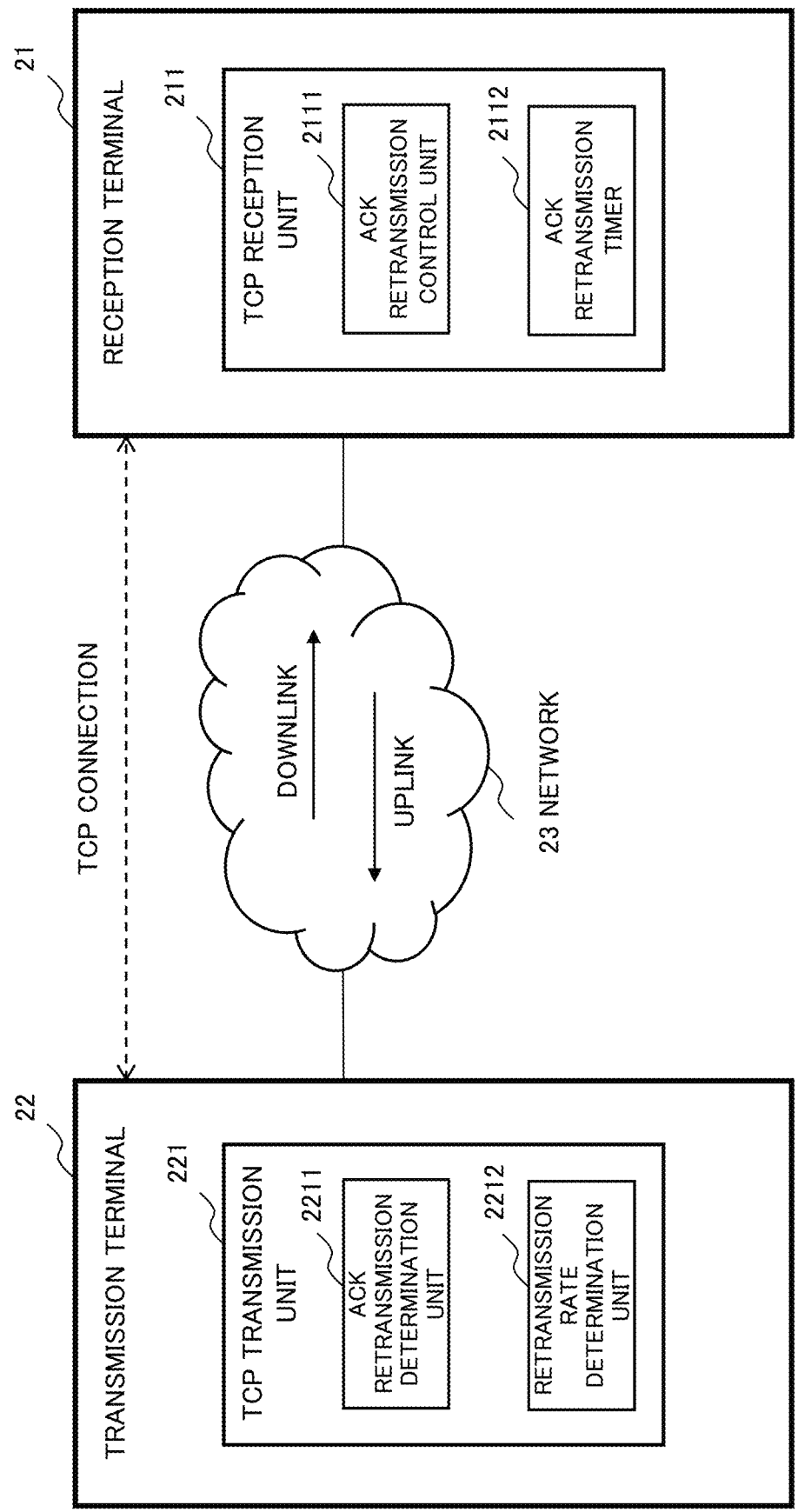
FIG. 6 is a block diagram illustrating a configuration example of a communication system according to a second example embodiment of the present invention.

FIG. 6 is a block diagram illustrating a configuration example of a communication system according to the second example embodiment of the present invention.

A communication system 20 according to the second example embodiment has a configuration including a reception terminal 21 and a transmission terminal 22, and is connected onto a network 23 being a communication network that is capable of data transmission compliant with a communication standard of TCP, by establishing TCP connection. Since a network example, and directions of an uplink and a downlink are described in the first example embodiment, the description thereof is omitted.

The reception terminal 21 includes a TCP reception unit 211, and the transmission terminal 22 includes a TCP transmission unit 221. A data packet transmitted from the TCP transmission unit 221 is received by the TCP reception unit 211 via a downlink of TCP connection. The TCP reception unit 211 transmits an ACK packet of an acknowledgement for a received data packet via an uplink of TCP connection.

The TCP reception unit 211 provided in the reception terminal 21 has a configuration including an ACK retransmission control unit 2111 and an ACK retransmission timer 2112.

The ACK retransmission control unit 2111 is a circuit that controls retransmission of an ACK packet. After sending out an ACK packet for a received data packet, the ACK retransmission control unit 2111 starts the ACK retransmission timer 2112 in order to perform time-limited monitoring of arrival of a data packet to be received next. When the ACK retransmission control unit 2111 fails to receive a next data packet by the time the ACK retransmission timer 2112 times out, the ACK retransmission control unit 2111 retransmits an ACK packet. In other words, the ACK retransmission timer 2112 performs time-limited monitoring of an unarrival determination time by which the ACK retransmission timer 2112 determines that a data packet that the ACK retransmission timer 2112 waits to receive next does not arrive. A retransmitted ACK packet is referred to as a retransmission ACK or a retransmission ACK (RACK) packet, and prompts the transmission terminal 22 to transmit a next data packet.

A RACK packet informs the transmission terminal 22 that a next data packet for which an acknowledgement is made by an ACK packet has not arrived, and prompts retransmission of the next data packet. Then, in order to distinguish from an ACK of a normal acknowledgement and a duplicate ACK used during high-speed retransfer, a flag indicating that an ACK is a retransmitted ACK is saved in an option field of TCP standard. Application of this RACK is preferably agreed on between transmission and reception by three-way handshake performed during TCP connection establishment.

The ACK retransmission control unit 2111 starts the ACK retransmission timer 2112 at transmission of a RACK packet as well, and then waits for arrival of a data packet for which retransmission is requested. When the ACK retransmission control unit 2111 fails to receive a data packet even in this time-limited monitoring, the ACK retransmission control unit 2111 repeats time-limited monitoring of arrival of a data packet by the ACK retransmission timer 2112 by again transmitting a RACK packet. In this way, when a data packet for which retransmission is requested does not arrive, a RACK packet is repeatedly transmitted each time the unarrival determination time elapses.

Furthermore, the ACK retransmission control unit 2111 may add a time stamp indicating a transmission time, as time information of an ACK packet or a RACK packet. For this, time stamp option of TCP standard can be used.

As described above, the ACK retransmission timer 2112 is set to an unarrival determination time by which the ACK retransmission timer 2112 determines that a data packet that the ACK retransmission timer 2112 waits to receive next does not arrive. For example, an arrival interval of a data packet is estimated, based on a round trip time (RTT) being a packet round trip time between the transmission terminal 22 and the reception terminal 21, and an unarrival determination time can be set based on the estimated value. The RTT can be calculated by use of past history of measuring during transfer of a normal TCP packet. Moreover, as a set value of an unarrival determination time of the ACK retransmission timer 2112, 50 milliseconds used in "Fast Timer (used in transmission or the like of a delay ACK)" of a timer mechanism implemented in a TCP standard may be used as a fixed value.

The TCP transmission unit 221 provided in the transmission terminal 22 has a configuration including an ACK retransmission determination unit 2211 and a retransmission rate determination unit 2212.

The ACK retransmission determination unit 2211 discerns whether a received ACK packet is an ACK of a normal acknowledgement, a duplicate ACK requesting retransmission by high-speed retransfer, or a RACK being an ACK retransmitted based on the above-described ACK retransmission timer. When discerning that a received ACK packet is a RACK, the ACK retransmission determination unit 2211 calculates, based on time information of the most recently received ACK or RACK, and time information of a currently received RACK, a time difference therebetween. Then, it is estimated that no data packet has reached a reception side during a time indicated by the calculated time difference.

Note that, when the ACK retransmission control unit 2111 transmits by adding a time stamp indicating a transmission time, transmission time information from the reception terminal 21 is used as time information. Moreover, the ACK retransmission determination device 2211 may be configured in such a way that, when the ACK retransmission determination unit 2211 receives an ACK packet and a RACK packet, a reception time is added to each of the packets. In this case, reception time information in the transmission terminal 22 is used as time information. Hereinafter, a description is given assuming that the ACK retransmission control unit 2111 transmits by adding a time stamp indicating a transmission time, as time information.

The ACK retransmission determination unit 2211 estimates a data amount which fails to be received on a reception side, based on a time at which no data packet is estimated to have reached the reception side, transmission history of a data packet, or a size of a congestion window (cwnd).

The retransmission rate determination unit 2212 determines a transmittable data amount of a data packet in relation to a cwnd size by a transmission algorithm of TCP, and determines a suitable data retransmission amount considering status of a network. Then, an amount of data determined to be retransmitted is retransmitted as a data packet requested by a RACK packet and a succeeding data packet following the requested data packet.

Next, communication devices used as the above-described reception terminal 21 and transmission terminal 22 are described with reference to FIGS. 7 and 8.

Figure 7:
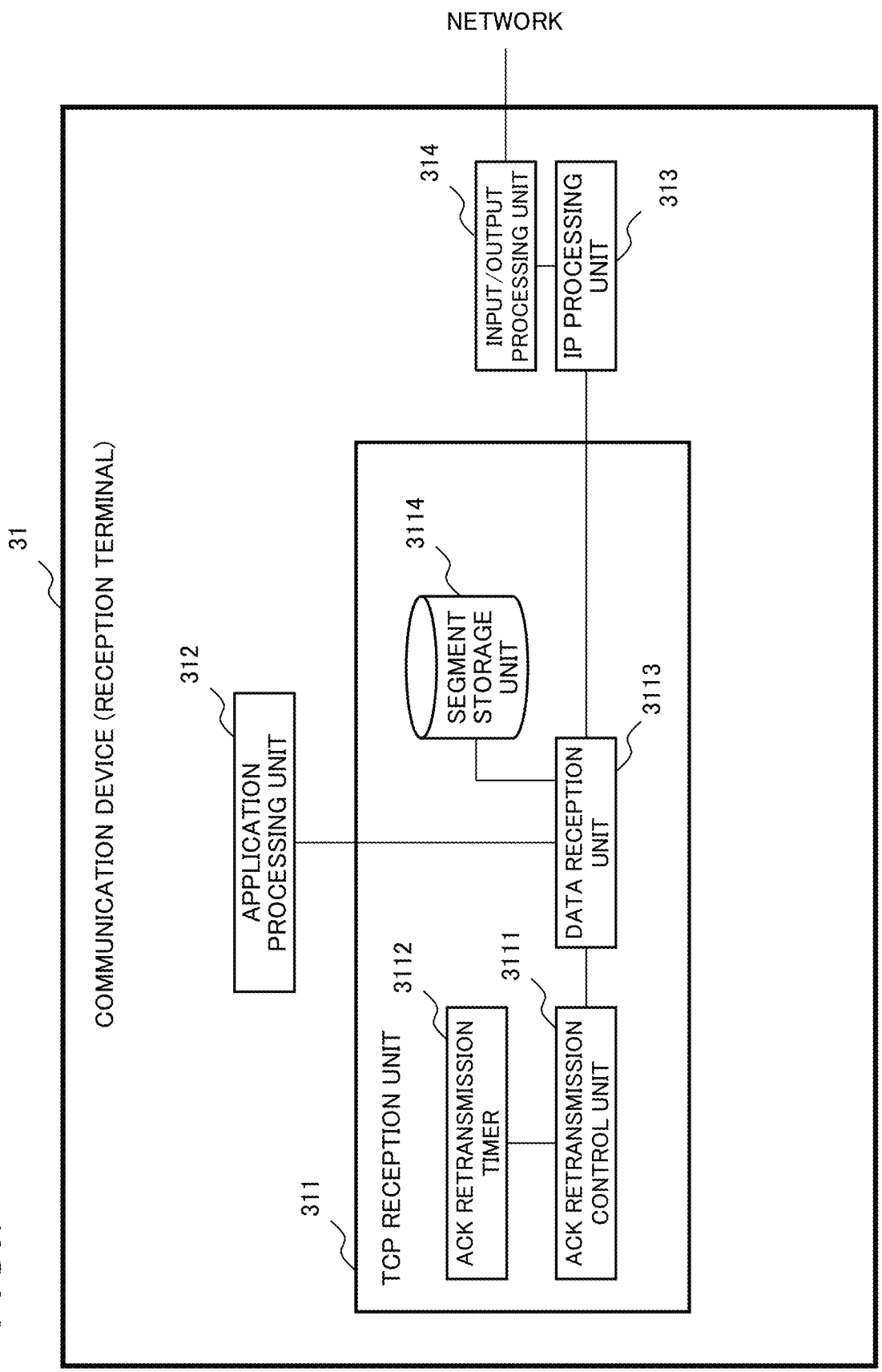
FIG. 7 is a block diagram illustrating a configuration example of a communication device as a reception terminal according to the second example embodiment of the present invention.

FIG. 7 is a block diagram illustrating a configuration example of a communication device as a reception terminal according to the second example embodiment of the present invention.

A communication device 31 is a communication device functioning as a reception terminal, and has a configuration including an application processing unit 312, a TCP reception unit 311, an IP processing unit 313, and an input/output processing unit 314.

The application processing unit 312 is a host application that receives or transfers data. The TCP reception unit 311 is a transport processing unit that receives data, and makes an acknowledgement of reception status of the data for a transmission side. The IP processing unit 313 is a network processing unit that controls network transfer of data. The input/output processing unit 314 is a data link processing unit that transmits and receives data via a physical link.

Each processing unit functions as follows.

The input/output processing unit 314 takes out an IP packet from frame data received from a network, and then passes the IP packet to the IP processing unit 313. The IP processing unit 313 takes out a TCP packet from the IP packet received from the input/output processing unit 314, and then passes the TCP packet to the TCP reception unit 311. The TCP reception unit 311 returns an ACK to the TCP packet received from the IP processing unit 313, converts the TCP packet into data, and then passes the data to the application processing unit 312. Then, the application processing unit 312 receives the data from the TCP reception unit 311.

The TCP reception unit 311 has a configuration including a data reception unit 3113 that receives a TCP packet, a segment storage unit 3114 which stores a segment, an ACK retransmission control unit 3111, and an ACK retransmission timer 3112. Note that, in the following description, a data packet means a TCP packet unless otherwise specified.

The data reception unit 3113 saves packet data (segment) of a received data packet in the segment storage unit 3114. Moreover, the data reception unit 3113 returns an ACK for a received data packet. A received segment is held in the segment storage unit 3114 for a predetermined time, and then output to the application processing unit 312.

The ACK retransmission control unit 3111 and the ACK retransmission timer 3112 control retransmission of an ACK packet for a received data packet.

The ACK retransmission control unit 3111 and the ACK retransmission timer 3112 have functions similar to those of the ACK retransmission control unit 2111 and the ACK retransmission timer 2112 described with reference to FIG. 6.

The ACK retransmission timer 3112 is set to, as a monitor time, an unarrival determination time by which the ACK retransmission timer 3112 determines that a data packet that the ACK retransmission timer 3112 waits to receive next after transmission of an ACK packet does not arrive.

In other words, after sending out an ACK packet for a received data packet, the ACK retransmission control unit 3111 starts the ACK retransmission timer 3112 in order to perform, by the unarrival determination time, time-limited monitoring of arrival of a data packet to be received next.

When the ACK retransmission control unit 3111 fails to receive a next data packet by the time the ACK retransmission timer 3112 times out, the ACK retransmission control unit 3111 transmits a RACK packet as a retransmission ACK. The ACK retransmission control unit 3111 also starts the ACK retransmission timer 3112 at transmission of a RACK packet, and, when a data packet for which retransmission is requested does not arrive, the ACK retransmission control unit 3111 repeatedly transmits a RACK packet each time the unarrival determination time elapses. A time stamp indicating a transmission time is added to each of an ACK packet and a RACK packet.

An arrival interval of a data packet is estimated based on RTT being a packet round trip time between a transmission terminal and a reception terminal, and an unarrival determination time to which the ACK retransmission timer 3112 is set can be determined based on the estimated value. For example, an arrival interval of a data packet can be estimated based on a reception window (rwnd) size being a latest value of an advertised window of which a transmission terminal is notified as being receivable, a maximum packet size, and an RTT. Then, a time (timer value) calculated by Equation (1), based on the estimated value can be determined as an unarrival determination time.

$$\text{Timer value} = 1/\{\alpha \times (\text{rwnd}/\text{RTT})/\text{maximum packet size}\} \qquad \text{Equation (1)}$$

In Equation (1), the maximum packet size is a maximum data amount of a packet transmitted by a transmission terminal. $\alpha$ is a coefficient for absorbing fluctuation of an arrival time of a packet, and $\alpha > 1$. For example, $\alpha = 1000$.

In Equation (1), rwnd/RTT is an assumed maximum data transfer speed. By dividing this speed by a maximum packet size, a number of transferred packets per unit time is acquired. Then, by taking a reciprocal number of the number of transferred packets per unit time, an arrival interval of a packet when data transfer is performed with assumed maximum throughput is acquired.

The ACK retransmission control unit 3111 acquires the measured maximum packet size and RTT, and estimates an arrival interval of a packet by use of Equation (1). Then, when a time that elapses after an ACK packet is transmitted reaches the above-described calculated and set unarrival determination time, the ACK retransmission control unit 3111 performs retransmission of an ACK packet (transmission of a RACK packet). The ACK retransmission control unit 3111 may calculate RTT by use of history of data and an ACK received between a transmission terminal and a reception terminal in the past. Moreover, the ACK retransmission control unit 3111 may acquire a maximum packet size by use of a maximum segment size notified of in a maximum segment size (MSS) option.

Furthermore, when the ACK retransmission timer 3112 once times out, a monitor time to be set next may be set to $\beta(\beta>1)$ times.

A RACK packet saves, in an option field of TCP standard, a flag indicating that the RACK packet is a retransmitted ACK. Moreover, a RACK packet may save out of band (OOB) data indicating that the RACK packet is a retransmitted ACK. The out of band data are data having a predetermined flag, and are data that can be distinguished from a normal data stream. Further, the out of band data can be distributed independently of normal data.

Figure 8:
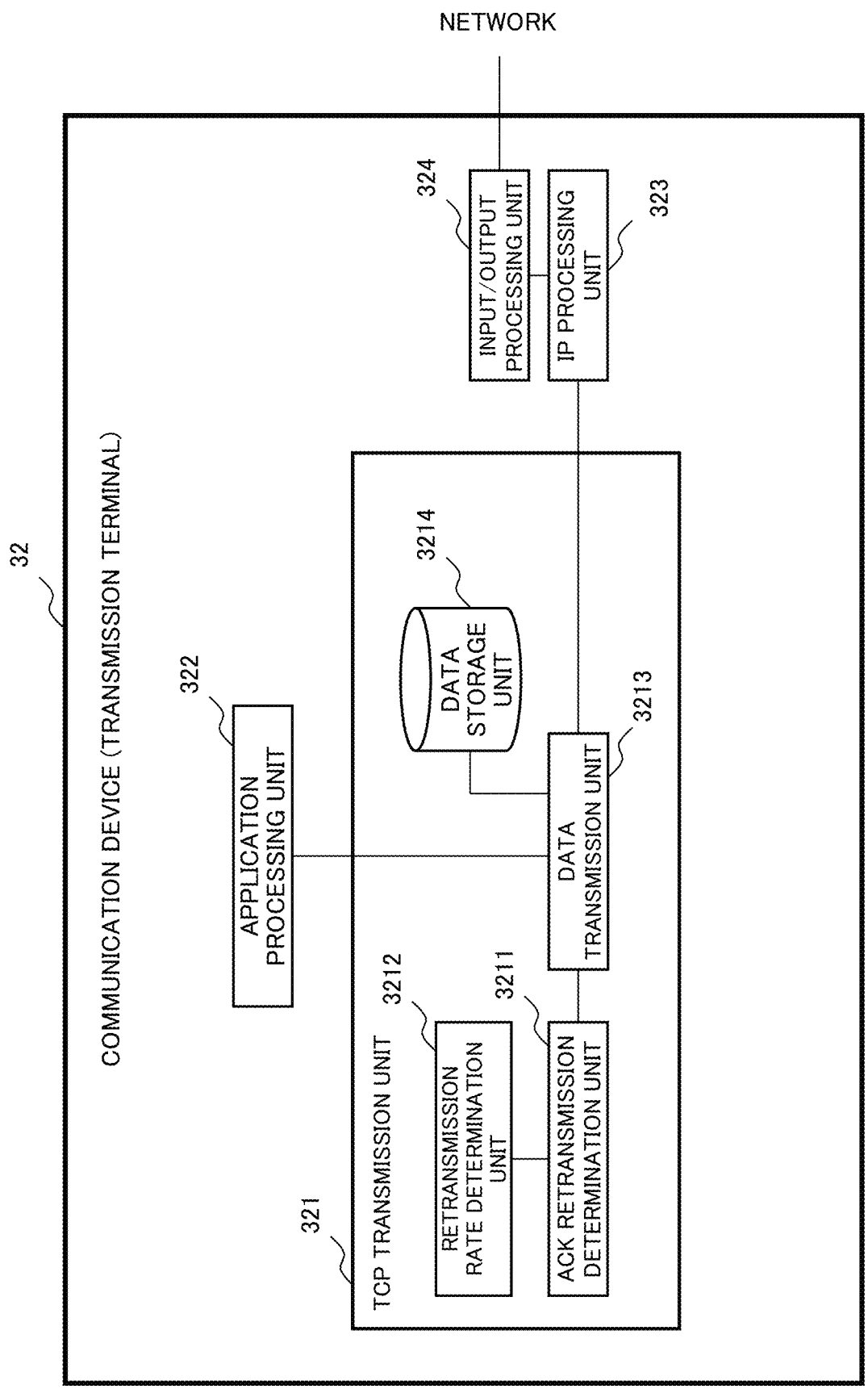
FIG. 8 is a block diagram illustrating a configuration example of a communication device as a transmission terminal according to the second example embodiment of the present invention.

FIG. 8 is a block diagram illustrating a configuration example of a communication device as a transmission terminal according to the second example embodiment of the present invention.

A communication device 32 is a communication device functioning as a transmission terminal, and has a configuration including an application processing unit 322, a TCP transmission unit 321, an IP processing unit 323, and an input/output processing unit 324.

The application processing unit 322 is a host application that generates or transfers data. The TCP transmission unit 321 is a transport processing unit that performs transmission and retransmission of data. The IP processing unit 323 is a network processing unit that controls network transfer of data. The input/output processing unit 324 is a data link processing unit that transmits and receives data via a physical link.

Each processing unit functions as follows.

The application processing unit 322 generates data to be transmitted, and then passes the data to the TCP transmission unit 321. The TCP transmission unit 321 receives, from the application processing unit 322, the data to be transmitted, and segments the data to be transmitted, into a TCP packet, in order to perform reliable communication while performing rate control. The IP processing unit 323 converts data of the TCP packet received from the TCP transmission unit 321 into an IP packet, and then passes the IP packet to the input/output processing unit 324. The input/output processing unit 324 converts the IP packet passed from the IP processing unit 323 into a frame, and then outputs the frame to a network.

The TCP transmission unit 321 has a configuration including a data transmission unit 3213 which transmits, as a TCP packet, data received from the application processing unit 322, a data storage unit 3214 which stores data, an ACK retransmission determination unit 3211, and a retransmission rate determination unit 3212.

The ACK retransmission determination unit 3211 discerns whether an ACK packet transmitted from a reception terminal is an ACK of a normal acknowledgement, a duplicate ACK requesting retransmission by high-speed retransfer, or a RACK being a retransmitted ACK. When discerning that a received ACK packet is a RACK, the ACK retransmission determination unit 2211 calculates a time difference between a currently received RACK and the most recently received ACK or RACK with reference to a time stamp of an ACK received just before the ACK packet or a RACK. In other words, it is estimated that no data packet has reached a reception side during a time indicated by the time difference between a transmission time of the most recently received ACK or RACK and a transmission time of a currently received RACK.

More specifically, the ACK retransmission determination unit 3211 stores a time stamp (t_ack) saved in a received ACK packet. In a case where there is a data packet that has been transmitted but for which no acknowledgement is received, a time stamp (t_rack) saved in a RACK packet is referred to when the RACK packet is received. Then, a time (ACK_INT) between an ACK packet and a RACK packet indicated in Equation (2) is estimated as a time in which a reception side does not receive a data packet. (ACK_INT) is also referred to as a retransmission ACK interval time.

$$ACK\_INT = t\_rack - t\_ack \qquad \text{Equation (2)}$$

Then, the ACK retransmission determination unit 3211 estimates and specifies a data amount which fails to be received on a reception side, based on a time at which no data packet is estimated to have reached to the reception side, transmission history of a data packet, or a size of a congestion window (cwnd).

When transmission history of a data packet is used, transmission time of each transmitted data packet is recorded as transmission history. Moreover, a data packet sent out within the time (ACK_INT) calculated by the above-described Equation (2) from a transmission time of a data packet transmitted after receiving an acknowledgement can be specified, and thereby determined as a data amount which fails to be received on a reception side. In other words, it is estimated that a succeeding data packet transmitted within a retransmission ACK interval time headed by a data packet transmitted after receiving an acknowledgement by a most recent ACK packet from a reception side has disappeared.

Furthermore, when a congestion window size is used, a value acquired by multiplying, by a congestion window size, a ratio of the time (ACK_INT) in which no data packet is estimated to have reached a reception side to an RTT as indicated by Equation (3) can be determined as a retransmission data amount. The retransmission data amount is indicated by retransmission data (RD).

$$RD = cwnd \times ACK\_INT / RTT \qquad \text{Equation (3)}$$

Herein, ACK_INT≤RTT, except when high throughput is required.

Furthermore, a congestion window size is rated as a data amount transmittable for each RTT.

Based on the above, the ACK retransmission determination unit 3211 determines that it is necessary to retransmit an amount of data of calculated RD, headed by data transmitted after receiving an acknowledgement by a most recent ACK packet. This, including data transmitted after receiving an acknowledgement by a most recent ACK packet, is also a data amount transmitted by a transmission side within the above-described retransmission ACK interval time from the transmission time of the included data.

Although an example of estimating, based on a congestion window size, a data amount which fails to be received on a reception side is used in the following description, it goes without saying that estimating a data amount which fails to be received on a reception side based on transmission history of a data packet also functions in a similar way.

As described above, until receiving a data packet prompting transmission by a RACK packet, a reception side repeatedly transmits a RACK packet each time unarrival determination time to which an ACK retransmission timer is set times out. Accordingly, the ACK retransmission determination unit 3211 calculates the above-described retransmission data amount each time a RACK packet is received.

When a time stamp saved in a RACK packet is (t_rack_i), a time difference (ACK_INT_i) between the time stamp (t_rack_i) and a time stamp (t_rack_i-1) saved in a RACK packet received last is acquired as in Equation (4).

$$\text{ACK\_INT}\_i = (t\_rack\_i) - (t\_rack\_i-1) \quad \text{Equation (4)}$$

A retransmission data amount (RD_i) in this case is indicated by Equation (5).

$$\text{RD}\_i = \text{cwnd} \times \text{ACK\_INT}\_i / \text{RTT} \quad \text{Equation (5)}$$

The retransmission rate determination unit 3212 determines a transmittable data amount of a data packet in relation to a congestion window size by a transmission algorithm of TCP, and determines a suitable data retransmission amount considering status of a network. In other words, when a sum (ΣRD) of a calculated retransmission data amount reaches the congestion window size, control is performed in such a way that retransmission of a head packet of data specified by an ACK packet is repeated. When retransmission is repeated, retransmission may be suspended in order to prevent congestion. Further, contrarily, when high throughput is required, data exceeding the congestion window size may be transmitted.

An amount of retransmission data determined in relation to the congestion window size is retransmitted as a data packet requested by a RACK packet and a succeeding data packet following the requested data packet.

An example of data transaction by retransmission introducing the above-described RACK packet is described with reference to time out retransmission of normal TCP and retransmission by a technique disclosed by PTL 4.

Figure 9:
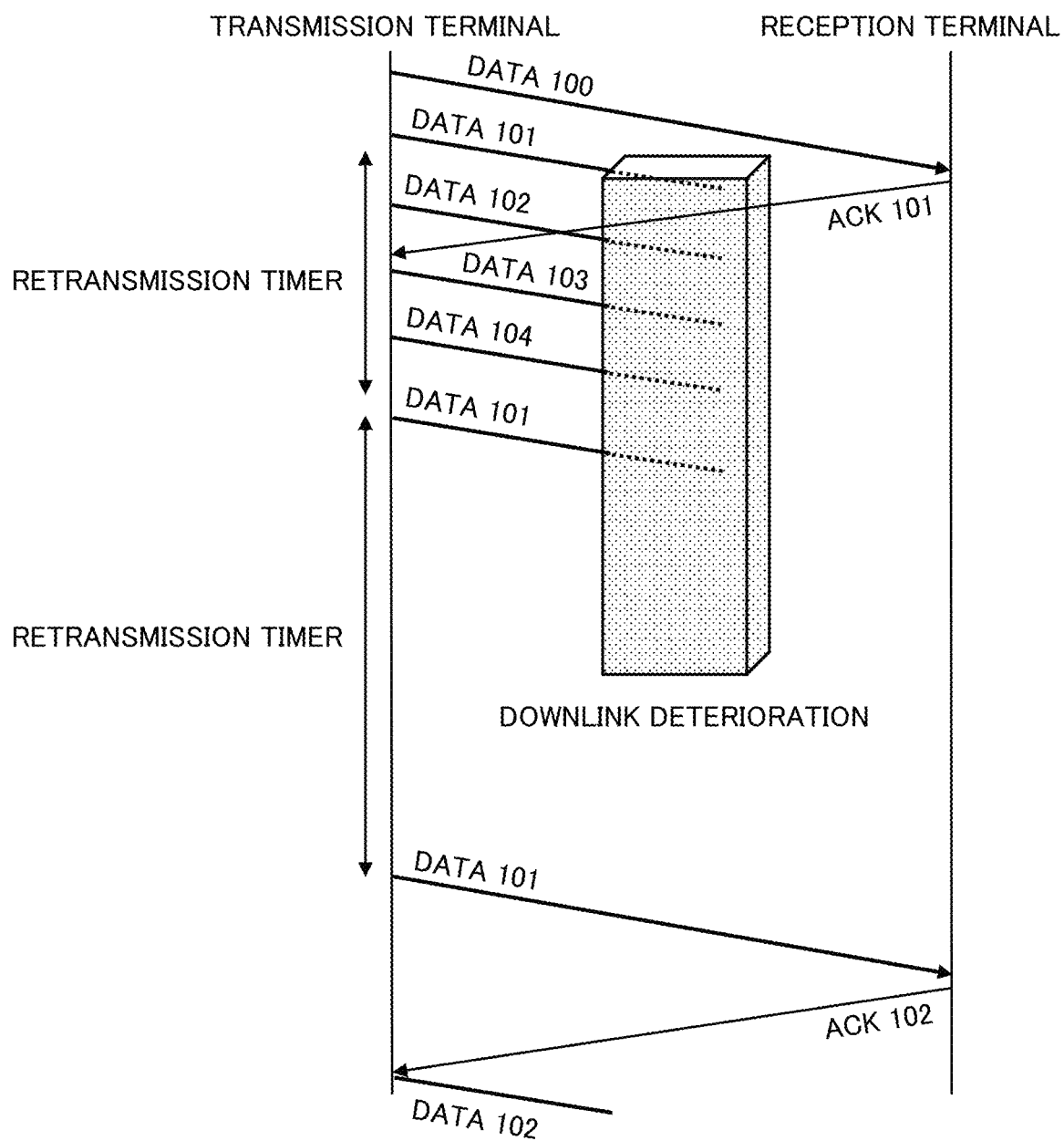
FIG. 9 is a sequence diagram illustrating data transaction describing an example in which time out retransmission of TCP is performed.
Figure 10:
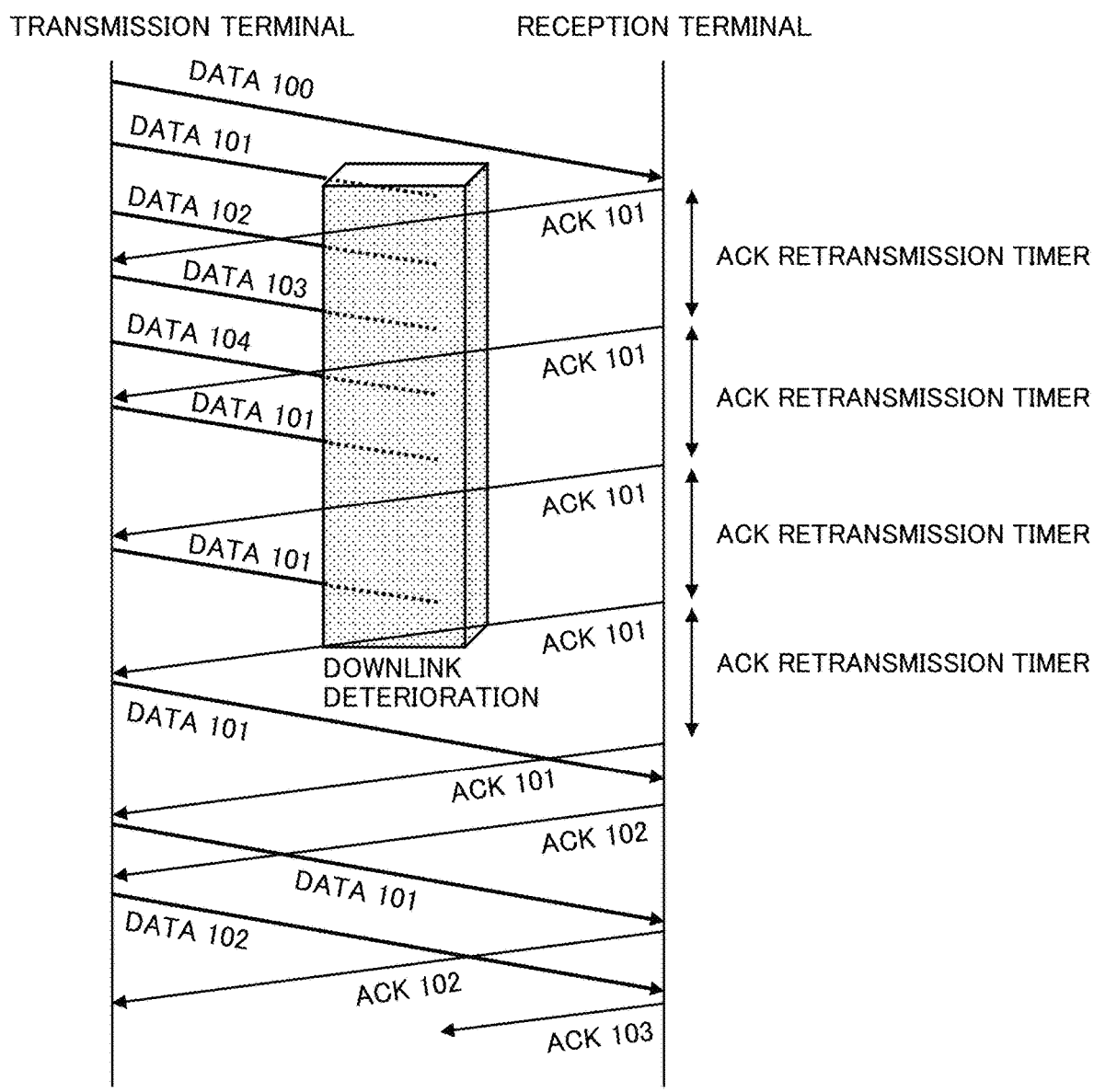
FIG. 10 is a sequence diagram illustrating data transaction describing an example in which retransmission is performed by a technique disclosed by PTL 4.

FIG. 9 is a sequence diagram illustrating data transaction describing an example in which time out retransmission of TCP is performed. FIG. 10 is a sequence diagram illustrating data transaction describing an example in which retransmission is performed by the technique disclosed by PTL 4.

Figure 11:
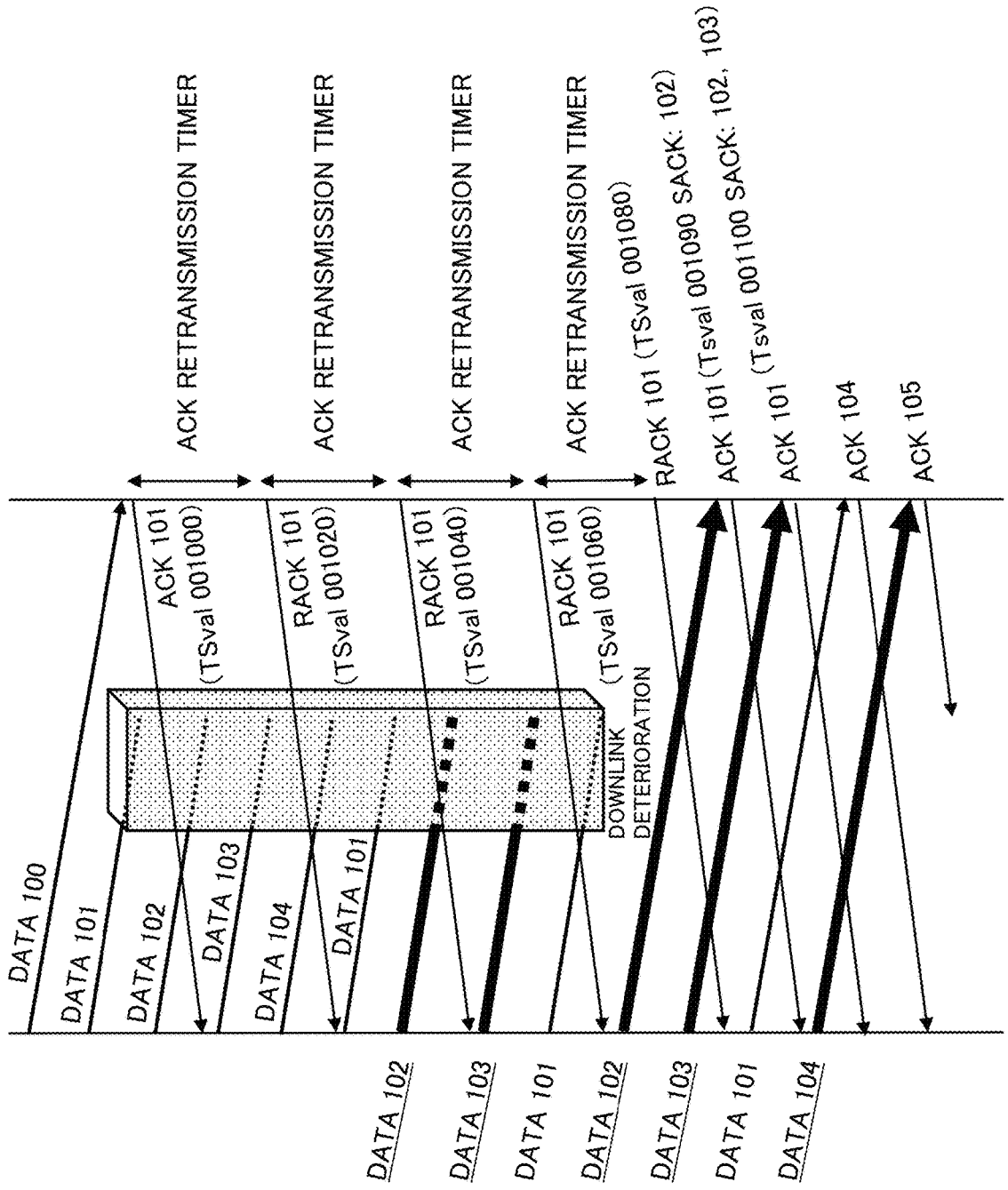
FIG. 11 is a sequence diagram illustrating data transaction describing an example in which retransmission is performed by the second example embodiment of the present invention.

Further, FIG. 11 is a sequence diagram illustrating data transaction describing an example in which retransmission is performed by the second example embodiment of the present invention.

Note that, in each of FIGS. 9 to 11, a part of a shaded rectangular parallelepiped indicates a period in which a downlink deteriorates. It is assumed that a data packet flowing in the downlink disappears in this period.

Time out retransmission of normal TCP illustrated in FIG. 9 is described.

It is assumed that five data packets (data 100 to 104) are transmitted in succession in a range of a window size without receiving an ACK. It is assumed that, among the data, the data 100 being an initial data packet reach a reception terminal, but the other data 101 to 104 disappear while being transmitted in a downlink.

An ACK 101 being an acknowledgement of the data 100 which have reached the reception terminal is returned from the reception terminal, and received by a transmission terminal. However, since the other data 101 to 104 disappear while being transmitted in the downlink, no acknowledgement is returned. Therefore, in the transmission terminal, a retransmission timer set when the data 101 are transmitted times out, and data 101 are retransmitted.

However, the retransmitted data 101 also disappear while being transmitted in the downlink.

Thus, a retransmission timer set to be longer times out when the retransmitted data 101 are transmitted, and second retransmitted data 101 are transmitted from the transmission terminal. At this point, communication quality of the downlink is improved, and the second retransmitted data 101 reach the reception terminal.

The reception terminal that has received the data 101 returns an ACK 102 being an acknowledgement of the data 101. The transmission terminal that has received the ACK 102 transmits the requested data 102.

In this way, in the example in which time out retransmission of normal TCP is applied, data throughput of the transmission terminal is decreased after a situation where a large number of data packets disappear in succession is resolved.

Next, an example illustrated in FIG. 10 in which retransmission is performed by the technique disclosed by PTL 4 is described. With the technique disclosed by PTL 4, a retransmission ACK packet prompting retransmission is transmitted when a next data packet fails to be received within a predetermined time after returning an ACK packet of an acknowledgement. To the retransmission ACK packet, predetermined information indicating that the packet is a retransmission ACK packet is added.

It is assumed that five data packets (data 100 to 104) are transmitted in succession in a range of a window size without receiving an ACK. It is assumed that, among the data, the data 100 being an initial data packet reach a reception terminal, but the other data 101 to 104 disappear while being transmitted in a downlink.

An ACK 101 being an acknowledgement of the data 100 that have reached the reception terminal is returned from the reception terminal, and received by a transmission terminal. However, the other data 101 to 104 disappear while being transmitted in the downlink, and do not reach the reception terminal. Therefore, in the reception terminal, an ACK retransmission timer set when the ACK 101 is returned times out, and the ACK 101 is retransmitted.

The transmission terminal that has received the ACK 101 being a retransmission ACK packet retransmits data 101. However, the retransmitted data 101 also disappear while being transmitted in the downlink.

Since no data packet reaches the reception side while the downlink deteriorates, an ACK retransmission timer is repeatedly set, and an ACK 101 being a retransmission ACK packet is repeatedly transmitted. Then, the transmission terminal retransmits data 101 each time the transmission terminal receives an ACK 101 being a retransmission ACK packet.

The data 101 retransmitted after communication quality of the downlink is improved reaches the reception terminal. The reception terminal that has received the data 101 returns a normal ACK 102 being an acknowledgement of the data 101. The transmission terminal that has received the ACK 102 transmits the requested data 102.

In this way, in the example in which retransmission is performed by the technique disclosed by PTL 4 as well, data throughput of the transmission terminal is decreased after a situation where a large number of data packets disappear in succession is resolved.

Next, an example in which retransmission is performed by the present example embodiment illustrated in FIG. 11 is described.

It is assumed that five data packets (data 100 to 104) are transmitted in succession in a range of a window size without receiving an ACK. It is assumed that, among the data, the data 100 being an initial data packet reach a reception terminal, but the other data 101 to 104 disappear while being transmitted in a downlink.

An ACK 101 being an acknowledgement of the data 100 that have reached the reception terminal is returned from the reception terminal, and received by a transmission terminal. However, the other data 101 to 104 disappear while being transmitted in the downlink, and do not reach the reception terminal. Therefore, in the reception terminal, an ACK retransmission timer set when the ACK 101 is returned times out, and RACK 101 is retransmitted.

Herein, it is assumed that, as a time stamp value (TSval), "1000" is saved in the ACK 101, and "1020" is saved in the RACK 101.

The transmission terminal that has received the RACK 101 recognizes that the RACK 101 is a retransmission ACK, and estimates a data amount to be retransmitted.

A time difference between the ACK 101 and the RACK 101 is acquired by the above-described Equation (2).

$$ACK\_INT = t\_rack - t\_ack = 1020 - 1000 = 20$$

Then, a data amount transmitted by the transmission terminal in a time indicated by the time difference between the ACK 101 and the RACK 101 is acquired by Equation (3). Note that RTT=30 and cwnd=3 are assumed.

$$RD = cwnd \times ACK\_INT/RTT = 3 \times 20/30 = 2$$

In other words, the transmission terminal calculates the data 101 and 102 being two data packets, as a data amount to be retransmitted. Then, as retransmission data for the RACK 101 (TSval 001020), the data 102 (indicated by a heavy line) are retransmitted in addition to the data 101. However, the retransmitted data 101 and 102 also disappear while being transmitted in the downlink.

Since no data packet reaches the reception terminal in a period in which a downlink deteriorates, an ACK retransmission timer is repeatedly set, and a RACK 101 being a retransmission ACK packet is repeatedly transmitted.

However, in the present example embodiment, a time stamp is saved in each RACK.

Thus, the transmission terminal calculates a transmission data amount from time stamp values of the received RACK 101 (TSval 001040) and the most recently received RACK 101 (TSval 001020), based on Equations (4) and (5).

$$ACK\_INT\_2 = (t\_rack\_2) - (t\_rack\_1) = 20$$

$$RD\_2 = cwnd \times ACK\_INT\_2/RTT = 3 \times 20/30 = 2$$

By the above, the transmission terminal determines that two data packets are to be retransmitted to the RACK 101 (TSval 001040). Further, the transmission terminal stores that data retransmitted for the RACK 101 (TSval 001020) received last time are the data 101 and 102, and determines to transmit starting from the data 103 this time.

Herein, $\Sigma RD = RD + RD\_2 = 4$, and cwnd=3 is exceeded. Thus, the transmission terminal transmits the data 101 being a head of the data being retransmitted, after the data 103 (indicated by a heavy line). However, the retransmitted data 103 and 101 also disappear while being transmitted in the downlink.

Thereafter, because the retransmitted data packet is not brought to the reception terminal due to deterioration of the downlink, the transmission terminal receives the RACK 101 (TSval 001060) and the RACK 101 (TSval 001080). When these RACK packets are received as well, a retransmission data amount is calculated based on a time stamp, RTT, and a congestion window size as described above, and a suitable data amount determined in relation to the congestion window size is retransmitted.

When communication quality of the downlink is improved, and then data come to arrive at the reception terminal, the reception terminal transmits an ACK (sack: xxx) packet including a selective ACK (SACK) signal indicating partial reception, and then collects the received data packets.

For example, in FIG. 11, the data 102 (indicated by a heavy line) and 103 (indicated by a heavy line) retransmitted for the RACK 101 (TSval 001060) reach the reception terminal. The reception terminal transmits an ACK 101 (sack: 102) packet as an acknowledgement for the data 102, and makes an acknowledgement that the data 101 are not received, but the data 102 are received. Moreover, the reception terminal transmits an ACK 101 (sack: 102 and 103) packet as an acknowledgement for the data 103, and makes an acknowledgement that the data 101 are not received yet, but the data 102 and 103 are received.

On the other hand, the transmission terminal determines to retransmit two packets for the RACK 101 (TSval 001080). Moreover, since a window has slid in response to the ACK 101 including the SACK signal immediately after the ACK 101, the transmission terminal retransmits the data 101 and 104 (indicated by heavy lines).

By receiving the data 101 retransmitted for the RACK 101 (TSval 001080), the reception terminal transmits an ACK 104 of a normal acknowledgement indicating that data are collected up to the data 101, 102, and 103. Moreover, because the data 104 retransmitted for the RACK 101 (TSval 001080) also reach the reception terminal, the reception terminal transmits an ACK 105 of a normal acknowledgement.

As described above, in the present example embodiment, a transmission terminal that has received a RACK packet retransmits not only data for which retransmission is requested, but also data estimated to have not reached a reception terminal. Thus, even after a situation where a large number of data packets disappear in succession is resolved, data throughput of the transmission terminal is not decreased, and communication performance can be instantly improved.

An operation of the communication device according to the present example embodiment is described with reference to FIGS. 12 and 13.

Figure 12:
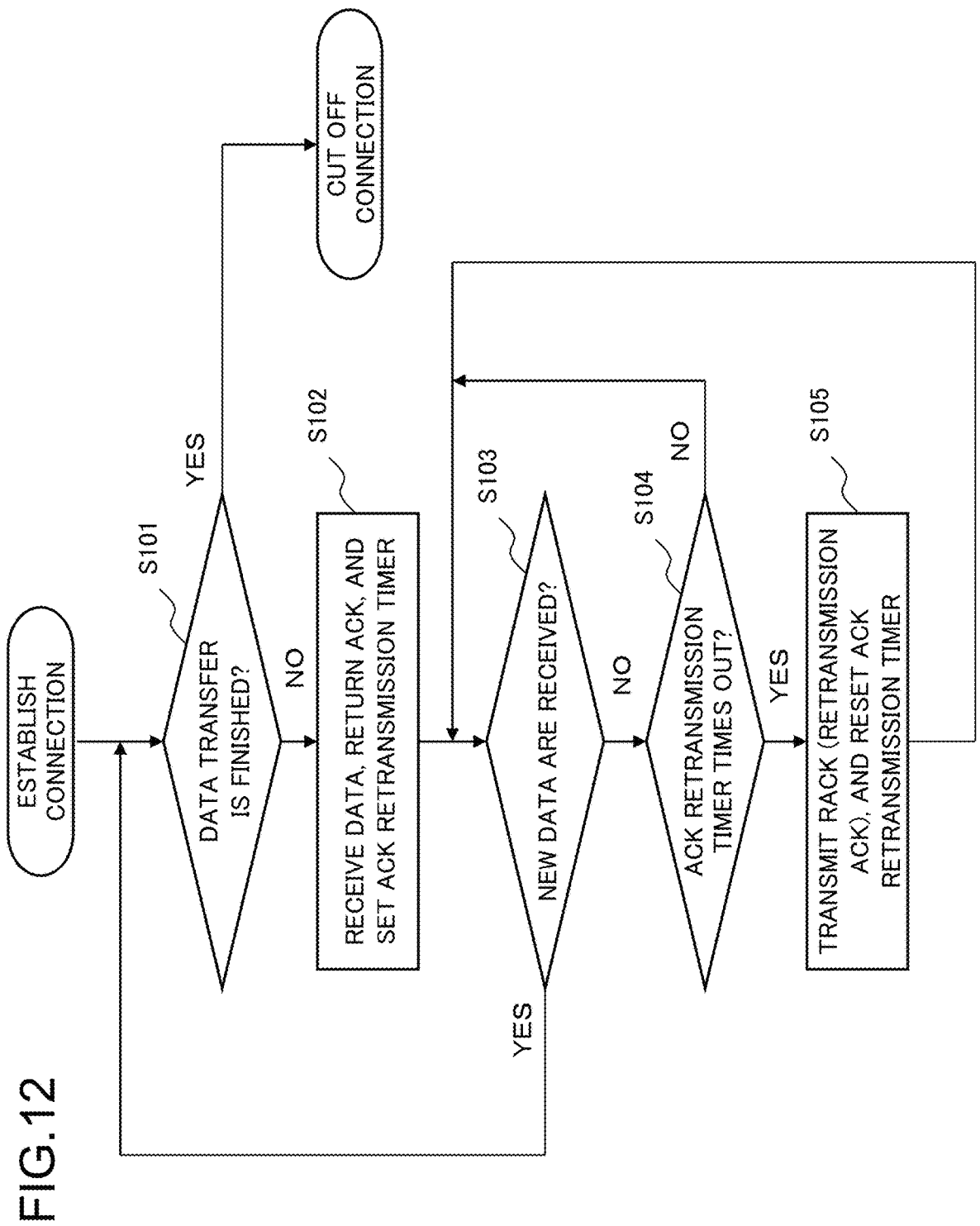
FIG. 12 is a flowchart describing an operation of retransmission request control on a reception side according to the second example embodiment of the present invention.

FIG. 12 illustrates an operation when the communication device functions as a reception terminal, and FIG. 13 illustrates an operation when the communication device functions as a transmission terminal.

FIG. 12 is a flowchart describing an operation of retransmission acknowledgement control on a reception side according to the second example embodiment of the present invention.

A reception terminal starts reception processing by establishing connection in a procedure of three-way handshake between the reception terminal and a transmission terminal requesting start of connection.

The reception terminal waits for reception of a packet transmitted from the transmission terminal, and determines based on contents of the received packet whether or not data transfer is finished (S101). When the received packet is a finish (FIN) packet indicating disconnection (S101, YES), the reception terminal finishes processing by returning a response of disconnection (FIN/ACK). Moreover, when a received packet is a packet including data (S101, NO), the processing is advanced to a step S102.

In the step S102, the received data are passed to an application, and an ACK packet of an acknowledgement for data reception is returned. Additionally, in this instance, an ACK retransmission timer is set to an unarrival determination time as timing of waiting for arrival of a next data packet. When the processing is finished, the processing is advanced to a step S103.

In the step S103, whether or not a new data packet is received from the transmission terminal is determined. When a new data packet is received (S103, YES), the processing is returned to the step S101 by the ACK retransmission timer being canceled. When a new data packet is not received (S103, NO), determination of the ACK retransmission timer is waited for by the processing being advanced to a step S104.

In the step S104, whether or not the ACK retransmission timer has timed out is determined. When an unarrival determination time of the ACK retransmission timer does not time out yet (S104, NO), the processing is returned to the step S103, reception of a new data packet from the transmission terminal is waited for, and whether or not the new data packet is received is determined. When an unarrival determination time of the ACK retransmission timer has timed out (S104, YES), the processing is advanced to a step S105.

In the step S104, due to timing out of the ACK retransmission timer, a RACK (retransmission ACK) packet is transmitted, and the ACK retransmission timer is reset to an unarrival determination time. Then, the processing is returned to the step S103, reception of a new data packet from the transmission terminal is waited for, and whether or not the new data packet is received is determined. In the RACK packet, a flag indicating that the RACK packet is a retransmitted ACK is set up. Moreover, as described above, out of band (OOB) data may be saved.

Now, an operation when the communication device functions as a transmission terminal is described.

FIG. 13 is a flowchart describing an operation of retransmission control on a transmission side according to the second example embodiment of the present invention.

A transmission terminal starts transmission processing by establishing connection in a procedure of three-way handshake between the transmission terminal and a reception terminal, when data to be transmitted are generated.

The presence or absence of data to be transmitted is confirmed (S201). When transfer of data to the reception terminal is completed, and there are no data to be transmitted (S201, YES), connection is cut off by the processing being finished. When there are data to be transmitted (S201, NO), the processing is advanced to a step S202.

In the step S202, whether or not transmission of data is possible is determined based on a transmission algorithm of TCP. In this case, a data number is reduced by returning of an acknowledgement for a transmitted data packet, and whether or not transmission is possible is determined in relation to a window size. Then, when it is determined that data transmission is possible (S202, YES), the processing is advanced to a step S203.

In the step S203, data are transmitted, a transmitted data number is stored, and the operation is returned to the processing in the step S201.

When, in the step S202, an acknowledgement for a transmitted data packet has not returned yet, and data transmission is not possible yet in relation to a window size (S202, NO), the processing is advanced to a step S204, and reception of an ACK packet is waited for.

When an ACK packet is received in the step S204, the processing is advanced to a step S205.

In the step S205, whether or not the received ACK packet is a retransmitted ACK packet (RACK packet) is determined.

When the received ACK packet is not a RACK packet (S205, NO), it is assumed that an acknowledgement is returned for the transmitted data packet associated with the received ACK packet, and then, a data number of the ACK packet is stored. Then, the operation is returned to the step S202.

On the other hand, when the received ACK packet is a RACK packet (S205, YES), it is recognized that retransmission of a data packet is prompted from the reception terminal, and the processing is advanced to steps S206 and S207.

In the step S206, an ACK transmission interval is calculated by above-described Equation (2) or Equation (4), and a retransmission data amount is determined by Equation (3) or Equation (5). In the step S207, a transmittable data amount of a data packet is determined in relation to a congestion window size, and suitable retransmission data considering status of a network are determined. Then, the operation is returned to the processing in the step S202, and the determined retransmission data are transmitted.

By the above operation, the transmission terminal can not only transmit next data for which an acknowledgement is received by an ACK packet, but also retransmit an amount of data determined in the step S206, headed by the next data.

As described above, in the present example embodiment, by use of time information of an ACK packet or a RACK packet, a transmission terminal calculates a time difference between pieces of time information of ACK packets or RACK packets before and after a repeatedly retransmitted RACK packet. With a time indicated by the time difference, a time in which no data packet has reached a reception side is estimated, and a data amount that fails to be received on a reception side during the time is estimated based on transmission history of a data packet or a size of a congestion window (cwnd). Then, the transmission terminal not only transmits next data for which an acknowledgement is received by an ACK packet, but also retransmits an amount of data estimated to fail to be received on the reception side, headed by the next data. Thus, even after a situation where a large number of data packets disappear in succession is resolved, data throughput of the transmission terminal is not decreased, and communication performance can be instantly improved.

Note that, the above-described communication device according to the present example embodiment may be configured by a computer in which a control program regulating processing operations such as packet transmission and reception, retransmission control, and a congestion avoidance algorithm by a communication standard of TCP is installed. Further, the communication device includes a calculation device, a storage device, a control device, a communication interface, and the like which are required for execution of the control program, and is connected to a network. For example, a hardware configuration illustrated in FIG. 4 described in the first example embodiment may be applied.

Note that, the whole or part of the example embodiments disclosed above can be described as, but not limited to, the following supplementary notes.

(Supplementary note 1) A communication system comprising:

a reception terminal that sets an unarrival determination time for determining that a next data packet does not arrive after transmitting an acknowledgement (ACK) packet for a received data packet, and, when a next data packet does not arrive within the unarrival determination time, repeatedly transmits a retransmission request (RACK) packet prompting transmission of the next data packet at intervals of the unarrival determination time; and a transmission terminal that specifies a data packet that has not reached the reception terminal, by use of time difference information based on time information of the most recently received ACK packet or the most recently received RACK packet and time information of the currently received RACK packet when receiving the RACK packet from the reception terminal on and after reception of the ACK packet, and then retransmits the specified data packet, wherein the time information is a time stamp added by the reception terminal to each of the ACK packet and the RACK packet when transmitted, or a time stamp added by the transmission terminal to each of the ACK packet and the RACK packet when received.

(Supplementary note 2) A communication device comprising retransmission control means for, when receiving a retransmission request (RACK) packet prompting transmission of a next data packet that is repeatedly transmitted by a reception side at an unarrival determination time interval for determining that a next data packet does not arrive on and after reception of an acknowledgement (ACK) packet returned by the reception side for a transmitted data packet, specifying a data packet that has not reached the reception side, by use of time difference information based on time information of the most recently received ACK packet or the most recently received RACK packet and time information of the currently received RACK packet, and then retransmitting the specified data packet, wherein the time information is a time stamp added by the reception side to each of the ACK packet and the RACK packet when transmitted, or a time stamp added by the retransmission control means to each of the ACK packet and the RACK packet when received.

(Supplementary note 3) The communication device according to supplementary note 2, wherein the retransmission control means includes ACK retransmission determination means for specifying a data packet that has not reached the reception side, based on a retransmission ACK interval time indicating a time difference between the time information of the currently received RACK packet and the time information of the most recently received ACK packet or the most recently received RACK packet, and retransmission rate determination means for determining an amount of retransmission data being determined in consideration of status of a network, for the specified data packet that has not reached the reception side.

(Supplementary note 4) The communication device according to supplementary note 3, wherein the ACK retransmission determination means specifies, including a data packet transmitted after receiving an acknowledgement by the ACK packet, a data packet transmitted during the retransmission ACK interval time from a transmission time of the former data packet, as a data packet that has not reached the reception side.

(Supplementary note 5) The communication device according to supplementary note 3, wherein the ACK retransmission determination means specifies, as a data packet that has not reached the reception side, a packet of a data amount acquired by multiplying a ratio of the retransmission ACK interval time to a round trip time (RTT) by a congestion window size.

(Supplementary note 6) The communication device according to any one of supplementary notes 3 to 5, wherein the retransmission rate determination means determines a data amount transmittable in relation to a congestion window size, for the specified data packet that has not reached the reception side.

(Supplementary note 7) The communication system according to supplementary note 1, wherein the transmission terminal is the communication device according to any one of supplementary notes 2 to 6.

(Supplementary note 8) A retransmission control method comprising:

receiving a retransmission request (RACK) packet prompting transmission of a next data packet that is repeatedly transmitted by a reception side at an unarrival determination time interval for determining that a next data packet does not arrive on and after reception of an acknowledgement (ACK) packet returned by the reception side for a transmitted data packet; and specifying a data packet that has not reached the reception side, by use of time difference information based on time information of the most recently received ACK packet or the most recently received RACK packet and time information of the currently received RACK packet, and then retransmitting the specified data packet, wherein the time information is a time stamp added to each of the ACK packet and the RACK packet when transmitted, or a time stamp added to each of the ACK packet and the RACK packet when received.

(Supplementary note 9) The retransmission control method according to supplementary note 8, further comprising specifying a data packet that has not reached the reception side, based on a retransmission ACK interval time indicating a time difference between the time information of the currently received RACK packet and the time information of the most recently received ACK packet or the most recently received RACK packet, and determining an amount of retransmission data being determined in consideration of status of a network, for the specified data packet that has not reached the reception side.

(Supplementary note 10) The retransmission control method according to supplementary note 9, further comprising specifying, including a data packet transmitted after receiving an acknowledgement by the ACK packet, a data packet transmitted during the retransmission ACK interval time from a transmission time of the former data packet, as a data packet that has not reached the reception side.

(Supplementary note 11) The retransmission control method according to supplementary note 9, further comprising specifying, as a data packet that has not reached the reception side, a packet of a data amount acquired by multiplying a ratio of the retransmission ACK interval time to a round trip time (RTT) by a congestion window size.

(Supplementary note 12) The retransmission control method according to any one of supplementary notes 9 to 11, further comprising determining a data amount transmittable in relation to a congestion window size, for the specified data packet that has not reached the reception side.

(Supplementary note 13) A retransmission control program causing a computer to function as retransmission control function means for, when receiving a retransmission request (RACK) packet prompting transmission of a next data packet that is repeatedly transmitted by a reception side at an unarrival determination time interval for determining that a next data packet does not arrive on and after reception of an acknowledgement (ACK) packet returned by the reception side for a transmitted data packet, specifying a data packet that has not reached the reception side, by use of time difference information based on time information of the most recently received ACK packet or the most recently received RACK packet and time information of the currently received RACK packet, and then retransmitting the specified data packet, wherein the time information is a time stamp added by the reception side to each of the ACK packet and the RACK packet when transmitted, or a time stamp added by the retransmission control function means to each of the ACK packet and the RACK packet when received.

(Supplementary note 14) The retransmission control program according to supplementary note 13, wherein the retransmission control function means further includes ACK retransmission determination function means for specifying a data packet that has not reached the reception side, based on a retransmission ACK interval time indicating a time difference between the time information of the currently received RACK packet and the time information of the most recently received ACK packet or the most recently received RACK packet, and retransmission rate determination function means for determining an amount of retransmission data being determined in consideration of status of a network, for the specified data packet that has not reached the reception side.

(Supplementary note 15) The retransmission control program according to supplementary note 14, wherein the ACK retransmission determination function means specifies, including a data packet transmitted after receiving an acknowledgement by the ACK packet, a data packet transmitted during the retransmission ACK interval time from a transmission time of the former data packet, as a data packet that has not reached the reception side.

(Supplementary note 16) The retransmission control program according to supplementary note 14, wherein the ACK retransmission determination function means specifies, as a data packet that has not reached the reception side, a packet of a data amount acquired by multiplying a ratio of the retransmission ACK interval time to a round trip time (RTT) by a congestion window size.

(Supplementary note 17) The retransmission control program according to any one of supplementary notes 14 to 16, wherein the retransmission rate determination function means determines a data amount transmittable in relation to a congestion window size, for the specified data packet that has not reached the reception side.

This application is based upon and claims the benefit of priority from Japanese Patent Application No. 2017-034413, filed on Feb. 27, 2017, the disclosure of which is incorporated herein by reference.

REFERENCE SIGNS LIST 10, 20 Communication system
11, 21 Reception terminal
12, 22 Transmission terminal
13, 23 Network
14, 31, 32 Communication device
140 Retransmission control unit
141 CPU
142 Main storage unit
143 Auxiliary storage unit
144 Communication unit
145 Input/output unit
146 System bus
150 Retransmission control function unit
211, 311 TCP reception unit
221, 321 TCP transmission unit
312, 322 Application processing unit
313, 323 IP processing unit
314, 324 Input/output processing unit
2111, 3111 ACK retransmission control unit
2112, 3112 ACK retransmission timer
2211, 3211 ACK retransmission determination unit
2212, 3212 Retransmission rate determination unit
3113 Data reception unit
3114 Segment storage unit
3213 Data transmission unit
3214 Data storage unit

The invention claimed is:

1. A communication device comprising:
a memory having recording therein computer readable instructions;
a processor configured to implement a retransmission controller when executing the instructions recorded in the memory, the retransmission controller configured to:
receive an acknowledgement (ACK) packet returned by a reception side for a transmitted data packet, wherein the transmitted data packet is one of a plurality of data packets ordered in a sequence;
receive a retransmission request (RACK) packet prompting transmission of a next data packet in the sequence following the transmitted data packet, wherein the RACK packet is repeatedly transmitted by the reception side at an unarrival determination time interval for determining that the next data packet does not arrive on and after reception of the acknowledgement (ACK) packet,
specify another data packet in the sequence that has not reached the reception side, by use of time difference information based on time information of the most recently received ACK packet and time information of the currently received RACK packet or time information of a most recently received RACK packet and the time information of the currently received RACK packet, and
retransmit the specified data packet, wherein
the time information is a time stamp added by the reception side to each of the ACK packet and the RACK packets when transmitted, or a time stamp added by the retransmission controller to each of the ACK packet and the RACK packets when received.

2. The communication device according to claim 1, wherein
the retransmission controller includes
an ACK retransmission determiner configured to specify a data packet that has not reached the reception side, based on a retransmission ACK interval time indicating a time difference between the time information of the currently received RACK packet and the time information of the most recently received ACK packet or between the time information of the currently received RACK packet and the time information of the most recently received RACK packet, and
a retransmission rate determiner configured to determine an amount of retransmission data being determined in consideration of a status of a network, for the specified data packet that has not reached the reception side.

3. The communication device according to claim 2, wherein the ACK retransmission determiner specifies, including a data packet transmitted after receiving an acknowledgement by the ACK packet, a data packet transmitted during the retransmission ACK interval time from a transmission time of the former data packet, as a data packet that has not reached the reception side.

4. The communication device according to claim 3, wherein the retransmission rate determiner determines a data amount transmittable in relation to a congestion window size, for the specified data packet that has not reached the reception side.

5. The communication device according to claim 2, wherein the ACK retransmission determiner specifies, as a data packet that has not reached the reception side, a packet of a data amount acquired by multiplying a ratio of the retransmission ACK interval time to a round trip time (RTT) by a congestion window size.

6. The communication device according to claim 5, wherein the retransmission rate determiner determines a data amount transmittable in relation to a congestion window size, for the specified data packet that has not reached the reception side.

7. The communication device according to claim 2, wherein the retransmission rate determiner determines a data amount transmittable in relation to a congestion window size, for the specified data packet that has not reached the reception side.

8. A retransmission control method performed by a processor of a communication device, comprising:
   receiving an acknowledgement (ACK) packet returned by a reception side for a transmitted data packet, wherein the transmitted data packet is one of a plurality of data packets ordered in a sequence;
   receiving a retransmission request (RACK) packet prompting transmission of a next data packet in the sequence following the transmitted data packet, wherein the RACK packet is repeatedly transmitted by the reception side at an unarrival determination time interval for determining that the next data packet does not arrive on and after reception of the acknowledgement (ACK) packet; and
   specifying another data packet in the sequence that has not reached the reception side, by use of time difference information based on time information of the most recently received ACK packet and time information of the currently received RACK packet or time information of a most recently received RACK packet and the time information of the currently received RACK packet, and
   retransmitting the specified data packet, wherein
   the time information is a time stamp added to each of the ACK packet and the RACK packets when transmitted, or a time stamp added to each of the ACK packet and the RACK packets when received.

9. The retransmission control method according to claim 8, further comprising specifying a data packet that has not reached the reception side, based on a retransmission ACK interval time indicating a time difference between the time information of the currently received RACK packet and the time information of the most recently received ACK packet or between the time information of the currently received RACK packet and the time information of the most recently received RACK packet, and determining an amount of retransmission data being determined in consideration of status of a network, for the specified data packet that has not reached the reception side.

10. The retransmission control method according to claim 9, further comprising specifying, including a data packet transmitted after receiving an acknowledgement by the ACK packet, a data packet transmitted during the retransmission ACK interval time from a transmission time of the former data packet, as a data packet that has not reached the reception side.

11. The retransmission control method according to claim 10, further comprising determining a data amount transmittable in relation to a congestion window size, for the specified data packet that has not reached the reception side.

12. The retransmission control method according to claim 9, further comprising specifying, as a data packet that has not reached the reception side, a packet of a data amount acquired by multiplying a ratio of the retransmission ACK interval time to a round trip time (RTT) by a congestion window size.

13. The retransmission control method according to claim 12, further comprising determining a data amount transmittable in relation to a congestion window size, for the specified data packet that has not reached the reception side.

14. The retransmission control method according to claim 9, further comprising determining a data amount transmittable in relation to a congestion window size, for the specified data packet that has not reached the reception side.

15. A tangible and non-transitory computer readable recording medium having recorded thereon a retransmission control program that when executed by a computer causes the computer to function as
   a retransmission controller configured to:
      receive an acknowledgement (ACK) packet returned by a reception side for a transmitted data packet, wherein the transmitted data packet is one of a plurality of data packets ordered in a sequence;
      receive a retransmission request (RACK) packet prompting transmission of a next data packet in the sequence following the transmitted data packet, wherein the RACK packet is repeatedly transmitted by the reception side at an unarrival determination time interval for determining that the next data packet does not arrive on and after reception of the acknowledgement (ACK) packet,
      specify another data packet in the sequence that has not reached the reception side, by use of time difference information based on time information of the most recently received ACK packet and time information of the currently received RACK packet or time information of a most recently received RACK packet and the time information of the currently received RACK packet, and
      retransmit the specified data packet, wherein
   the time information is a time stamp added by the reception side to each of the ACK packet and the RACK packets when transmitted, or a time stamp added by the retransmission controller to each of the ACK packet and the RACK packets when received.

16. The tangible and non-transitory computer readable recording medium according to claim 15, wherein the retransmission controller further includes an ACK retransmission determiner configured to specify a data packet that has not reached the reception side, based on a retransmission ACK interval time indicating a time difference between the time information of the currently received RACK packet and the time information of the most recently received ACK packet or between the time information of the currently received RACK packet and the time information of the most recently received RACK packet, and retransmission rate determiner configured to determine an amount of retransmission data being determined in consideration of status of a network, for the specified data packet that has not reached the reception side.

17. The tangible and non-transitory computer readable recording medium according to claim 16, wherein the ACK retransmission determiner specifies, including a data packet transmitted after receiving an acknowledgement by the ACK packet, a data packet transmitted during the retransmission ACK interval time from a transmission time of the former data packet, as a data packet that has not reached the reception side.

18. The tangible and non-transitory computer readable recording medium according to claim 17, wherein the retransmission rate determiner determines a data amount transmittable in relation to a congestion window size, for the specified data packet that has not reached the reception side.

19. The tangible and non-transitory computer readable recording medium according to claim 16, wherein the ACK retransmission determiner specifies, as a data packet that has not reached the reception side, a packet of a data amount acquired by multiplying a ratio of the retransmission ACK interval time to a round trip time (RTT) by a congestion window size.

20. The tangible and non-transitory computer readable recording medium according to claim 16, wherein the retransmission rate determiner determines a data amount transmittable in relation to a congestion window size, for the specified data packet that has not reached the reception side.

* * * * *